(12) United States Patent
Scott et al.

(10) Patent No.: US 12,180,814 B2
(45) Date of Patent: Dec. 31, 2024

(54) SYSTEM AND METHOD FOR ENHANCED OIL RECOVERY UTILIZING ALTERNATING STACKED LIQUID AND GAS SLUGS

(71) Applicant: EOR ETC LLC, Houston, TX (US)

(72) Inventors: Stuart Lindsey Scott, Pearland, TX (US); Adrian Paul Williams, Houston, TX (US)

(73) Assignee: EOR ETC LLC, Houston, TX (US)

( * ) Notice: Subject to any disclaimer, the term of this patent is extended or adjusted under 35 U.S.C. 154(b) by 0 days.

(21) Appl. No.: 17/802,918

(22) PCT Filed: Feb. 28, 2021

(86) PCT No.: PCT/US2021/020155
§ 371 (c)(1),
(2) Date: Aug. 26, 2022

(87) PCT Pub. No.: WO2021/174166
PCT Pub. Date: Sep. 2, 2021

(65) Prior Publication Data
US 2023/0151720 A1    May 18, 2023

Related U.S. Application Data

(60) Provisional application No. 62/983,354, filed on Feb. 28, 2020.

(51) Int. Cl.
*E21B 43/16* (2006.01)
*G05D 11/13* (2006.01)

(52) U.S. Cl.
CPC ............ *E21B 43/166* (2013.01); *G05D 11/13* (2013.01)

(58) Field of Classification Search
CPC .............................. E21B 43/166; G05D 11/13
See application file for complete search history.

(56) References Cited

U.S. PATENT DOCUMENTS

| | | | |
|---|---|---|---|
| 6,325,147 B1 | 12/2001 | Doerler et al. | |
| 2006/0065400 A1* | 3/2006 | Smith | E21B 43/2605 166/308.1 |
| 2012/0067568 A1* | 3/2012 | Palmer | E21B 43/40 166/402 |
| 2016/0177686 A1 | 6/2016 | Carvajal et al. | |
| 2017/0145800 A1* | 5/2017 | Davidsen | E21B 43/166 |
| 2019/0003290 A1* | 1/2019 | Krekel | E21B 43/16 |
| 2019/0186247 A1* | 6/2019 | Lau | E21B 43/166 |

FOREIGN PATENT DOCUMENTS

CN    209959220 U    1/2020

OTHER PUBLICATIONS

English translation of CN 209959220 U, 5 pages.
Extended European Search Report, dated Mar. 14, 2024, for EP 21760551.8 (15 pgs.).

\* cited by examiner

*Primary Examiner* — Silvana C Runyan
(74) *Attorney, Agent, or Firm* — Polsinelli PC

(57) ABSTRACT

System and method for conducting enhanced oil recovery by establishing a plurality of stacked, alternating slugs of gas and liquid travelling downhole into a subterranean well. The system can include a buffer tank, a gas inlet, a gas outlet, and a liquid outlet. The system can further include a pressure control configured to maintain a specified pressure in gas within the buffer tank and a fluid dispensing system in fluid communication with the gas and liquid outlet of the buffer tank.

20 Claims, 32 Drawing Sheets

SYSTEM AND METHOD FOR ENHANCED OIL RECOVERY UTILIZING ALTERNATING STACKED LIQUID AND GAS SLUGS

CROSS-REFERENCE TO RELATED APPLICATIONS

This application claims priority to U.S. Provisional Patent Application No. 62/983,354, filed on Feb. 28, 2020, entitled "SYSTEM AND METHOD FOR ENHANCED OIL RECOVERY UTILIZING CO-INJECTION OF LIQUID AND GAS," the contents of which are incorporated herein by reference in their entirety.

TECHNICAL FIELD

The present technology provides solutions for oil recovery, and in particular, for enhanced oil recovery (EOR) techniques that utilize an injection process that injects a series of alternating slugs of gas and liquid into a subterranean well.

BACKGROUND

Known Enhanced Oil Recovery ("EOR") methods generally have incorporated routines referred to as Water Alternating Gas (WAG) that entail injecting gas for an extended period of time (at least hours, and sometimes days), then injecting water for a similar period, and repeating the two until a target recharged pressure is achieved in the formation of interest.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
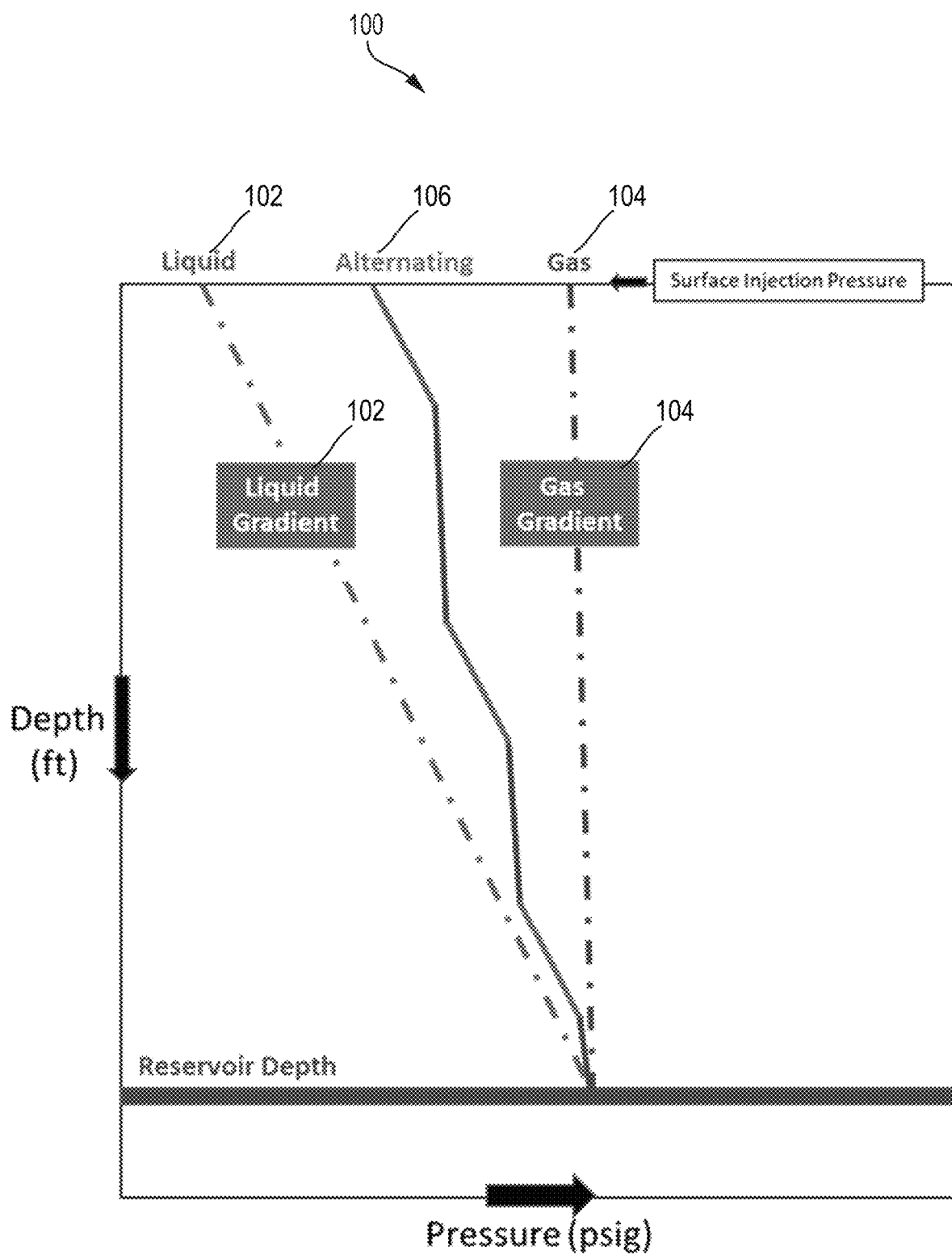
FIG. 1 illustrates example gradient curves of pressure versus depth that would exist for all-liquid (water) injection (left-most straight-line curve), all-gas injection (right-most, vertical straight-line curve) and rapidly alternating liquid/gas injection (middle straight-line curve) in accordance with aspects of the RSSS (Rapid-Switch, Stacked-Slug) embodiment of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Figure 22:
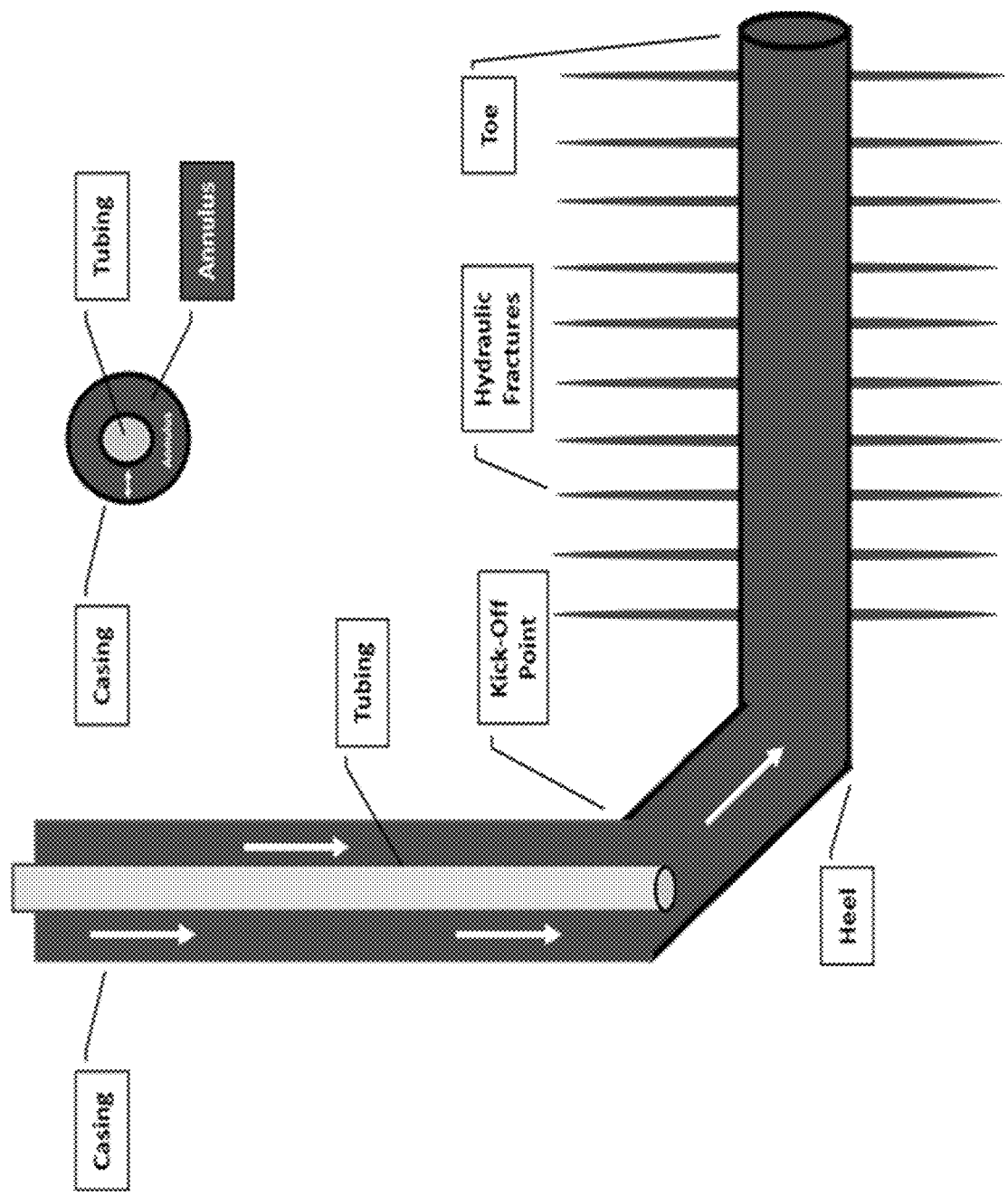
FIG. 22 illustrates a simplified configuration of tubing within the well casing of a horizontal well (completed without a packer) depicting the annular flow path therebetween in accordance with aspects of the present disclosure.

Re-pressuring injection for Enhanced Oil Recovery can be delivered into a depleted or partially depleted well in a number of ways. To reduce frictional pressure losses, injection using the largest available flow path is most often desired. However, too large of a flow path can reduce velocities below minimum needs. In most cases, the typical flow paths down oil and gas wells are suitable. Most generally, there are typically three flow paths. The first flow path is bounded by the well's casing formed by an outer string of pipe contacting the formation (typically, rock). The second flow path is formed by the well's tubing string that is smaller pipe within the casing typically used to improve production and can be used to implement various artificial lift methods. The third flow path is annulus defined by the annular space between the casing and the tubing. FIG. 22 illustrates an example casing and tubing in a horizontal well completed without a packer to highlight the annular flow path. Horizontal wells are Hydraulic Fracture Stimulated resulting in vertical fractures extending away from the wellbore at designed intervals. For annular injection, the injected fluid moves down through the annulus in the vertical and near vertical sections of the wellbore. The end of the tubing is typically positioned near the kick-off point where the vertical section transitions (curves) into the horizontal section. In EOR, injected fluid travels into the horizontal wellbore and exits into one or more of the vertical fractures and into contact with the reservoir rock through the natural and created fracture system extending into the reservoir. In accordance with the present disclosure, rapidly alternating slugs of gas and liquid injected down the annulus are designed to continue reasonably unmixed into the horizontal wellbore section.

In some instances, the wellbore can be entirely used for EOR injection such that the full casing diameter is effectively available for injection flow by way of simultaneous injection down the annulus and the inner tubing string. Whether the casing can be used for EOR injection typically depends on local/regional regulations. Use of the casing for EOR may be prohibited to prevent unintended leakage of pressured fluids before reaching the intended formation. If tubing injection is required, the EOR fluids are injected down the inner tubing and are prevented from flowing back up the annulus by a packer set between the tubing and the casing, above the bottom opening of the tubing, thereby sealing off the annulus as an upward pathway.

Figure 23:
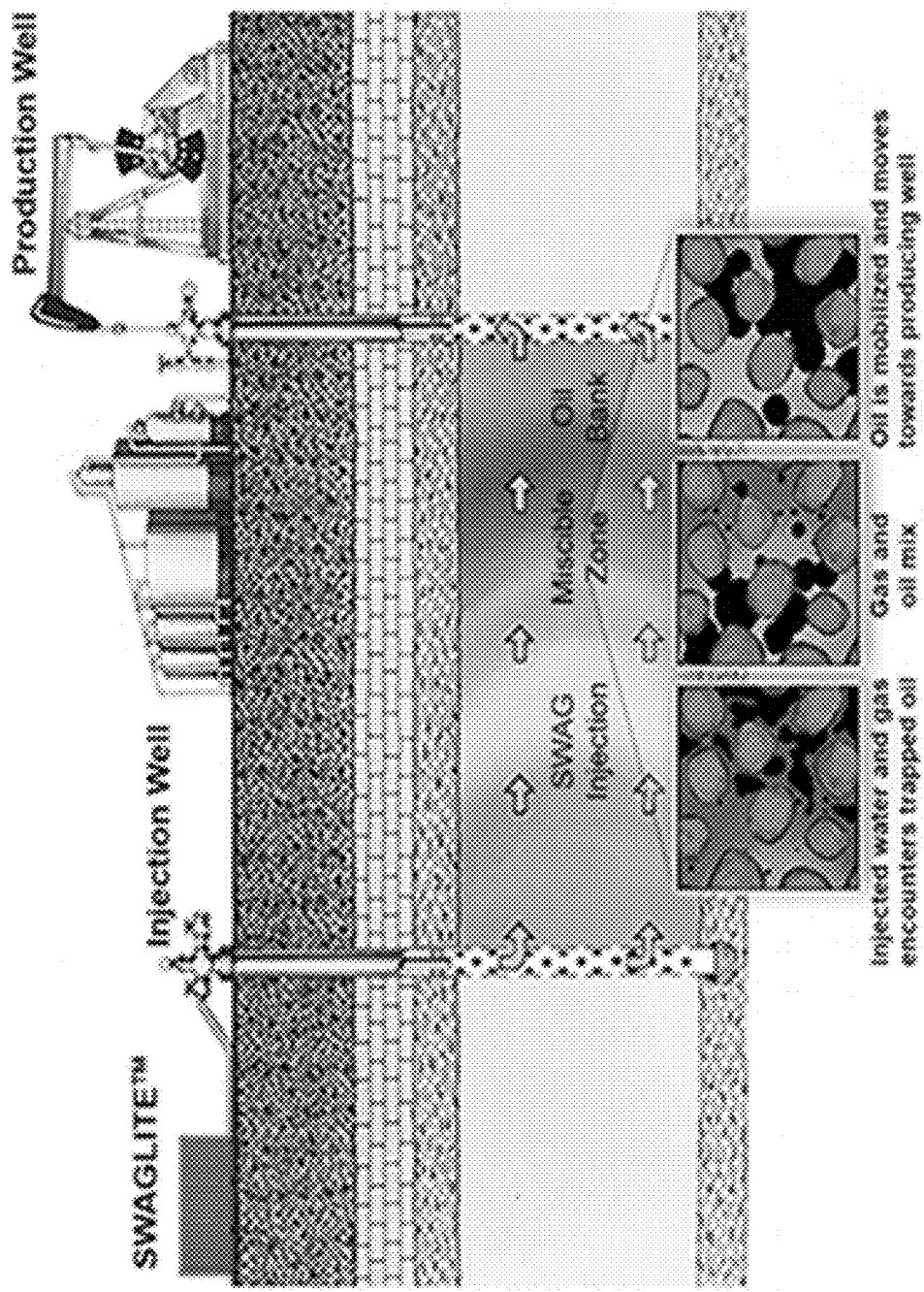
FIG. 23 illustrates an example of injected fluids moving from an injection well, pushing reservoir oil toward a producing well in accordance with aspects of the present disclosure.

Referring to FIG. 23, an example EOR process is illustrated in which injected fluids move from an injection well toward a producing well, and in the process push recoverable hydrocarbons to the producing well. In some instances, this type of injection has been referred to as a Simultaneous Water and Gas (SWAG) EOR process, but current methods for performing SWAG have rarely been implemented in the field due to phase segregation/separation problems (entrained gas separating out of the entraining liquids). In other configurations, SWAG injection can be performed in which one injection well moves fluids (radially outward) toward four (or more) surrounding producing wells (e.g., 5-spot) or in a pattern in which a line of injection wells move fluid toward a line of producing wells (e.g., line-injection).

Figure 24:
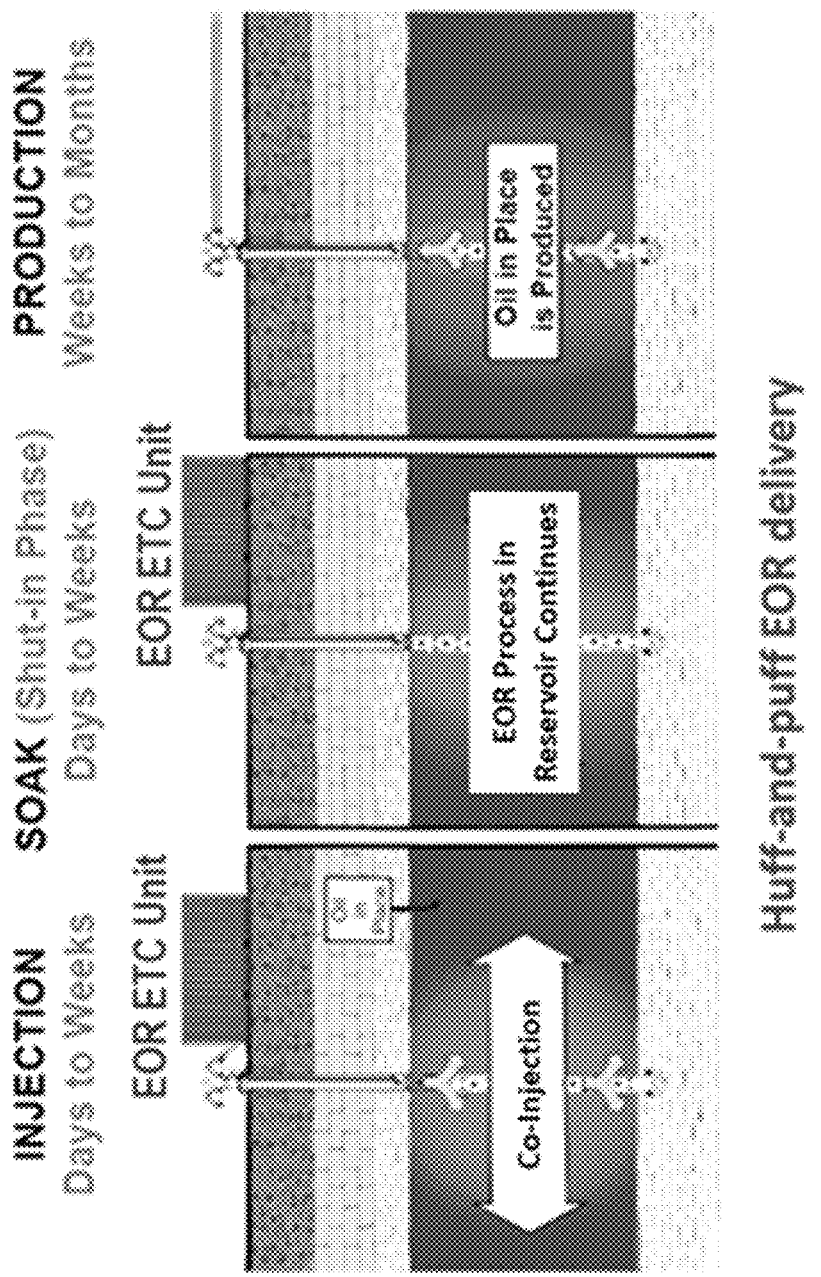
FIG. 24 illustrates an example of injecting fluids into a depleted or partially depleted well in accordance with aspects of the present disclosure.

During an EOR process, all of the well's flow paths are maintained for subsequent recharged production utilizing the tubing and various types of artificial lift (e.g., gas lift, jet pump, plunger lift, Electrical Submersible Pump (ESP), or rod pumping). FIG. 24 illustrates an example sequence in which recharge injection is performed upon a depleted or partially depleted well (left-hand illustration). This injection can occur over a period of several weeks, or longer. After injection, the well can be shut in for a "soak" period that can last for days, weeks or months. However, the soak period can also be dispensed with entirely, and production can begin when the recharge injection is completed. Regardless, the well is then put back on production and typically flowed for several months. This recharge/production cycle can be repeated multiple times until an economic limit is reached.

In the realm of Enhanced Oil Recovery, "diversion" refers to the sealing off of high conductivity flow paths (e.g., highly permeable formation zones) using "diverter" material so that the flow of injected recharge fluids is forced into less conductive flow paths. High pressure gas injection EOR processes do not lend themselves to diverter placement because the injected gas is not a good carrier of industry standard diverter. This includes fracturing balls/ropes, packers/plugs, caking materials (e.g., to reduce leak-off by building a filter cake on the rock of the flow path), viscosity enhancers and other related chemicals. In the instance of recharging with high-pressure gas, the injected gas moves along the path of least resistance and repeatedly treats the same fractures, cycle after cycle, thereby limiting reservoir contact, recovery, and production. These effects can be reduced if physical plugs are placed in the well in a process requiring an in-well intervention. The injection process enables many diverting methods that do not require an in-well intervention, although setting plugs is also possible with this process.

The presently disclosed recharge injection processes provide an ability to place diverter material and effectively seal off a set of fractures and divert flow into another set of fractures without the necessity of setting any plugs. These injection processes not only inject recharge fluid into high conductivity fractures, but a multitude of sequences can be devised to divert the EOR recharge fluids to other fractures in the wellbore. For example, injection without diversion can be performed for the first several (one to three) injection cycles. When recovery is observed to sufficiently decrease cycle-over-cycle, a dissolvable rope-type diverting agent can be pumped with the liquid slugs on subsequent cycles (four and more) to seal-off perforations or flow conduits (or at least decrease their permeability to the recharge fluid) that had taken up the injected recharge fluids in the initial injection cycles. In this manner, subsequent recharge fluid flow is diverted to fractures now having the lowest permeability (highest conductivity) in the formation, thereby exposing additional reservoir rock to both miscible gas and surfactant.

Figure 25:
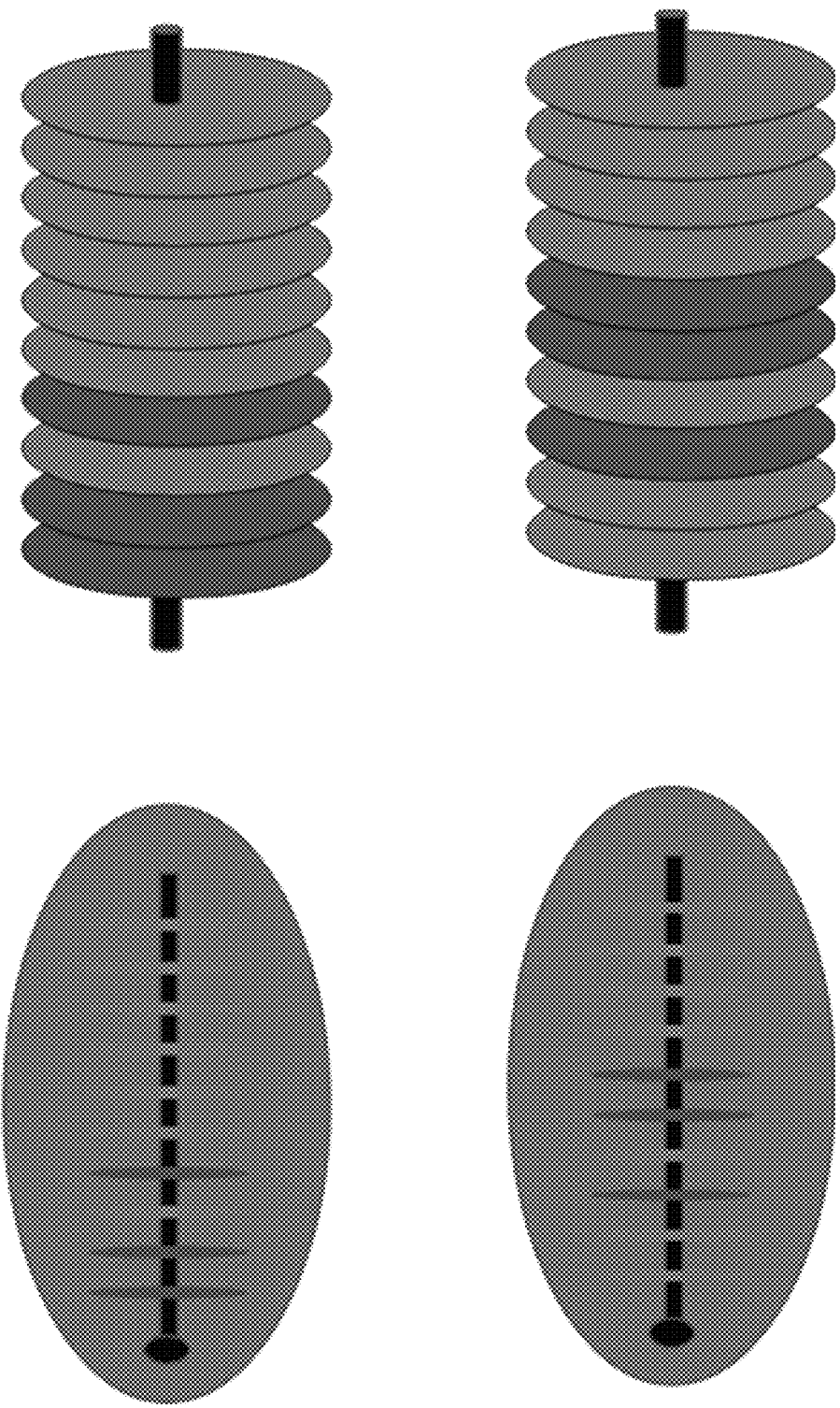
FIG. 25 illustrates an example of diversion of an injected flow in accordance with aspects of the present disclosure.

FIG. 25 illustrates an example of a diversion of an injected flow, where the first three injection cycles mainly flowed into the $1^{st}$, $2^{nd}$, and $4^{th}$ fractures (from the left, and as depicted in the top row). After diversion, these high conductive paths are temporarily sealed off and the injected recharge fluids flow into the $3^{rd}$, $5^{th}$, and $6^{th}$ fractures (from the left, and as depicted in the bottom row). This diversion process can be repeated in an iterative fashion to treat additional fractures and reservoir rock boosting recovery and production using the presently disclosed injection systems and processes.

As described herein, the present technology relates to systems and methods for enhanced oil recovery (EOR) techniques in which surface equipment is utilized to provide an ability to inject a combination of gas and liquid into a subterranean well or wells from at or near the surface. An aspect of the technology is that it requires significantly less surface injection pressure as compared to currently utilized high pressure compressed gas injection for similar enhanced oil recovery procedures. Still further, in addition to utilization in enhanced oil recovery, the techniques described herein can also be employed on storage/disposal wells used for subsurface gas/liquid storage or disposal.

The present technology allows for a self-contained system for recharging/repressurizing an oil well that has declined in production, and especially oil wells located in shale reservoirs, for enhanced oil recovery. The injection systems as described herein provide a low-cost method for increasing recovery from existing wells and significantly reduces the requirement to drill more expensive in-fill wells. The injection system of the present disclosure can also be utilized for multiple alternative applications that may require subsurface gas and liquid injection in line with ongoing initiatives such as fracturing hit protection, produced gas storage, $CO_2$ disposal, and produced water disposal. The injection system can include high frequency, alternating gas and liquid injection into a wellhead. This requires significantly lower surface injection pressure and lower power compared with alternative EOR systems. The injection system also provides a lower safety risk due to lower operation pressure, enclosed construction, and remote operation. The injection system as disclosed herein also includes containerized injection skids for easy transportation, deployment, commissioning, and operation. The injection system also provides remote operation with remote monitoring and local operation. Stabilized liquid and gas injection pressure can be maintained by the buffer tank of the injection system in conjunction with an injection pump configured to operate level control modes. In one example, the injection system provides rapid, high speed switching between liquid and gas injection slugs thereby establishing a series of alternating stacked liquid/gas slugs in a well with accurate injection rates and volume controls utilizing a flow control system as described herein including flowmeters, flowrate control valves, and high speed open/close valve configurations.

In at least one embodiment, a system for conducting Rapid-Switch, Stacked-Slug (RSSS) enhanced oil recovery is disclosed for establishing a plurality of stacked, alternating slugs of gas and liquid travelling downhole into a subterranean well. The system comprises (includes, but is not limited to) a buffer tank having a liquid inlet through which liquid is received from a liquids source into the buffer tank and a gas inlet through which gas is received from a pressured gas source into the buffer tank. The buffer tank also has a gas outlet in fluid communication with gas reservoired in the buffer tank and a liquid outlet in fluid communication with liquid reservoired in the buffer tank. The system includes a pressure control configured to maintain a specified pressure in the gas reservoired within the buffer tank and exerts a corresponding pressure on liquid also reservoired within the buffer tank. A fluid dispensing system is provided that has fluid communication with the gas and liquid outlets of the buffer tank and is controlled to deliver alternating slugs of gas and liquid to a subterranean wellhead. In this manner, the system establishes a plurality of stacked, alternating slugs of gas and liquid travelling downhole into a subterranean well.

Relatedly, a method for conducting enhanced oil recovery is also disclosed that establishes a plurality of stacked, alternating slugs of gas and liquid travelling downhole into a subterranean well. The method includes providing an enhanced oil recovery system having a buffer tank including a liquid inlet through which liquid is received from a liquids source into the buffer tank and a gas inlet through which gas is received from a pressured gas source into the buffer tank. The buffer tank also includes a gas outlet in fluid communication with gas reservoired in the buffer tank and a liquid outlet in fluid communication with liquid reservoired in the buffer tank. A pressure control maintains a specified pressure in gas reservoired within the buffer tank and the pressured gas reservoired within the buffer tank exerts a corresponding pressure on liquid reservoired within the buffer tank. A fluid dispensing system provides fluid communication with the gas and liquid outlets of the buffer tank and is controlled to deliver alternating slugs of gas and liquid to a subterranean wellhead. The fluid dispensing system dispenses the alternating slugs of gas and liquid into the subterranean wellhead, thereby establishing a plurality of stacked, alternating slugs of gas and liquid travelling downhole into a subterranean well.

As such, a need exists for Enhanced Oil Recovery (EOR) techniques that utilize an injection process that injects a combination of gas and liquid into a subterranean well, and that are relatively inexpensive.

FIG. 1 illustrates example gradient curves of pressure versus depth 100 that would exist for single-phase water injection 102 and gas injection 104. Water injection pressures are low due to the weight of the high-density liquid. The hydrostatic pressure gradient of water 102 is nearly a straight line as the fluid is only slightly compressible. During the gas injection phase of the traditional WAG process 104, the surface injection pressure is very high, typically near or slightly above the reservoir pressure. The hydrostatic gradient of the gas 104 in the tubing is very small due to the lower density of gas when compared with a liquid.

Shown between these two gradients 104, 106 is an example alternating gradient of the present disclosure where gas and liquid are injected into the wellbore in reasonably rapidly alternating slugs, but at least sufficiently rapid to create a stack of a plurality of alternating slugs in the wellbore. It should be appreciated that the alternating injection pressure 106 is lower than the surface injection pressure for single-phase gas 104. The pressure of the alternating injection pressure 106 is also higher than that used for the injection of single-phase water 102. While this tends to indicate a trade-off of benefits between the water and gas injection phases (lower pressure seemingly to be most desirable), in actuality, gas compression is much more energy intensive than liquid (e.g., water) pumping. Therefore, energy efficiency is improved by the presently disclosed rapid phase (liquid/gas) alternating injection process 100 as compared to known WAG processes. Also, facility modifications to implement the presently disclosed injection processes 100 are reduced further when an intermediate gas pressure source is available. This is common, both offshore and onshore, where a sales compressor can be a source for the injected gas and may already present the capabilities prescribed by the technology and techniques presently disclosed.

Figure 2:
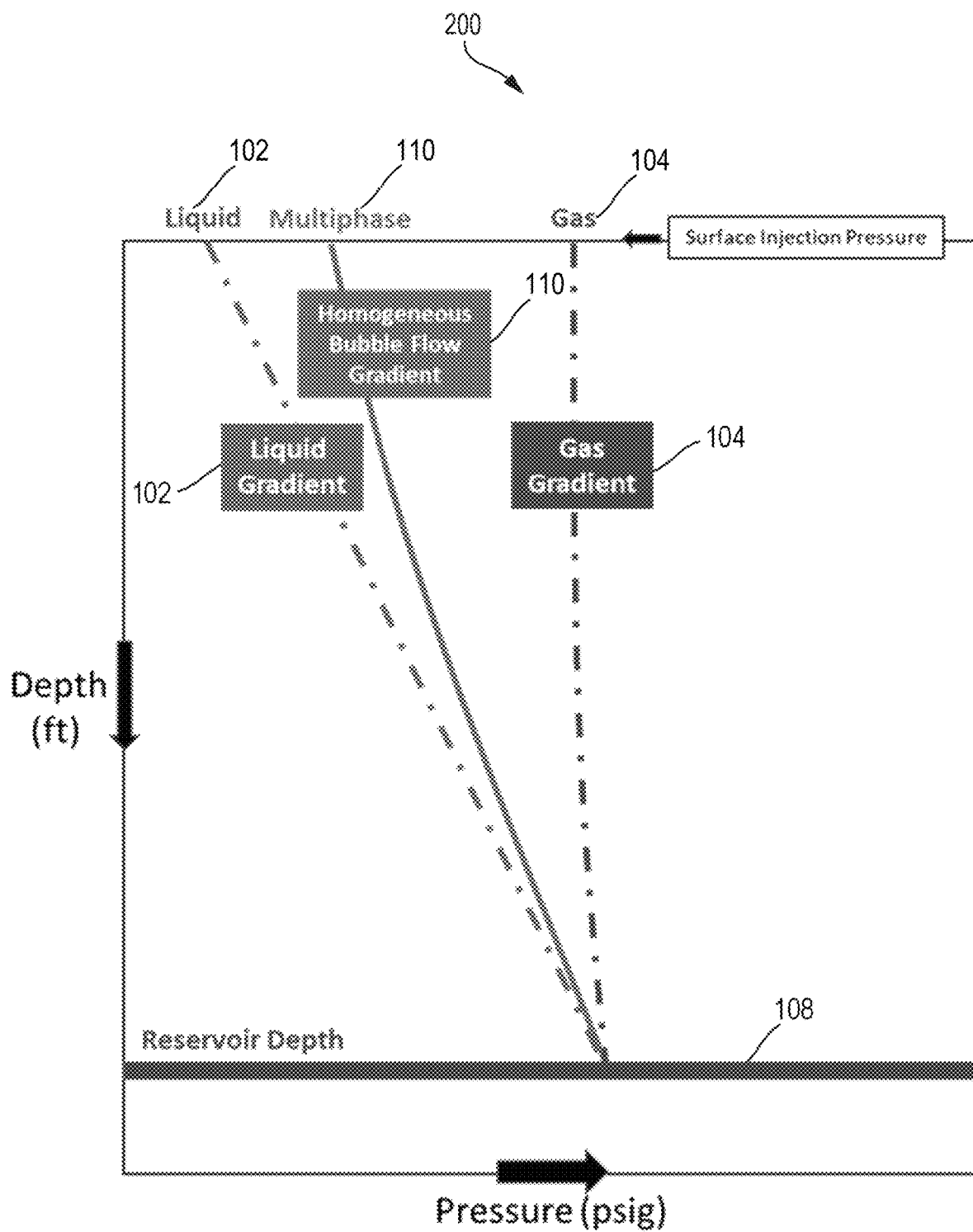
FIG. 2 illustrates example gradient curves of pressure versus depth that would exist for all liquid (water) injection {left-most), all gas injection {right-most} and continuously mixed-phase (liquid and gas) injection {middle solid line} in accordance with aspects of the continuous, mixed-phase injection embodiment of the present disclosure.

Aspects of the presently disclosed technology include injection enhancement methods that enable reduced energy consumption and improvements in reservoir recovery. FIG. 2 illustrates an example gradient curve 200 of continuous mixed phase injection in accordance with aspects of the present disclosure. First, as illustrated in FIG. 2, given an available pressure from a surface gas source, there is an optimal amount of complimentary liquid that is required to obtain and maintain injectivity to the reservoir at a particular time during the injection cycle 110 from wellhead to target formation depth. If more liquid is added than is required for its needed weight contribution to the drive pressure, less gas is provided to the reservoir, reducing flowback energy. If the liquid added is too little to assist in driving the gas component to the target formation, then injectivity may be lost as pressure at the bottomhole 108 of the wellbore may be less than reservoir pressure.

Figure 8:
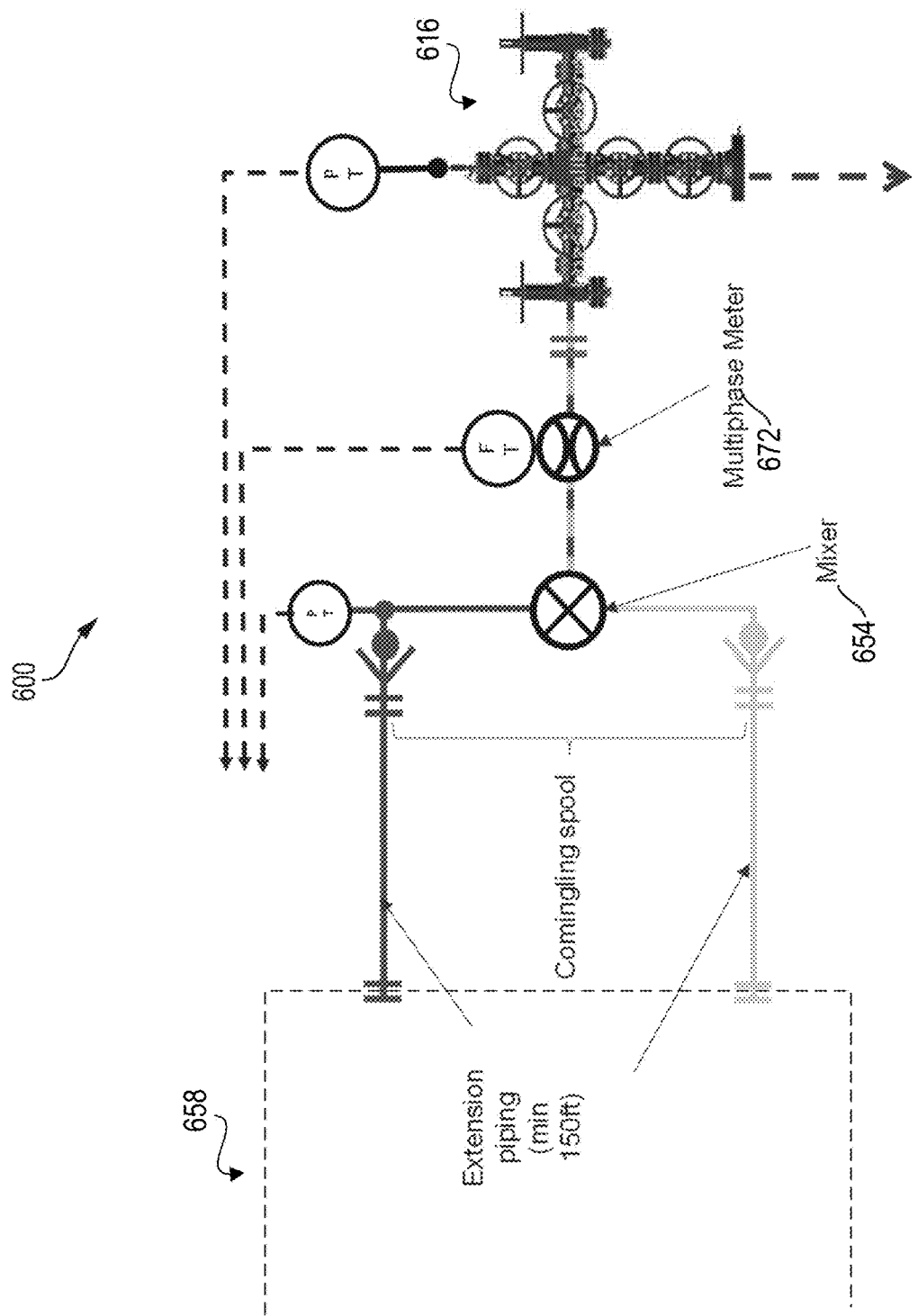
FIG. 8 illustrates an example of the mixed-phase injection system of FIG. 6, but featuring the comingling spool that acts as a mixer of the liquid and gas phases in accordance with aspects of the present disclosure.
Figure 9:
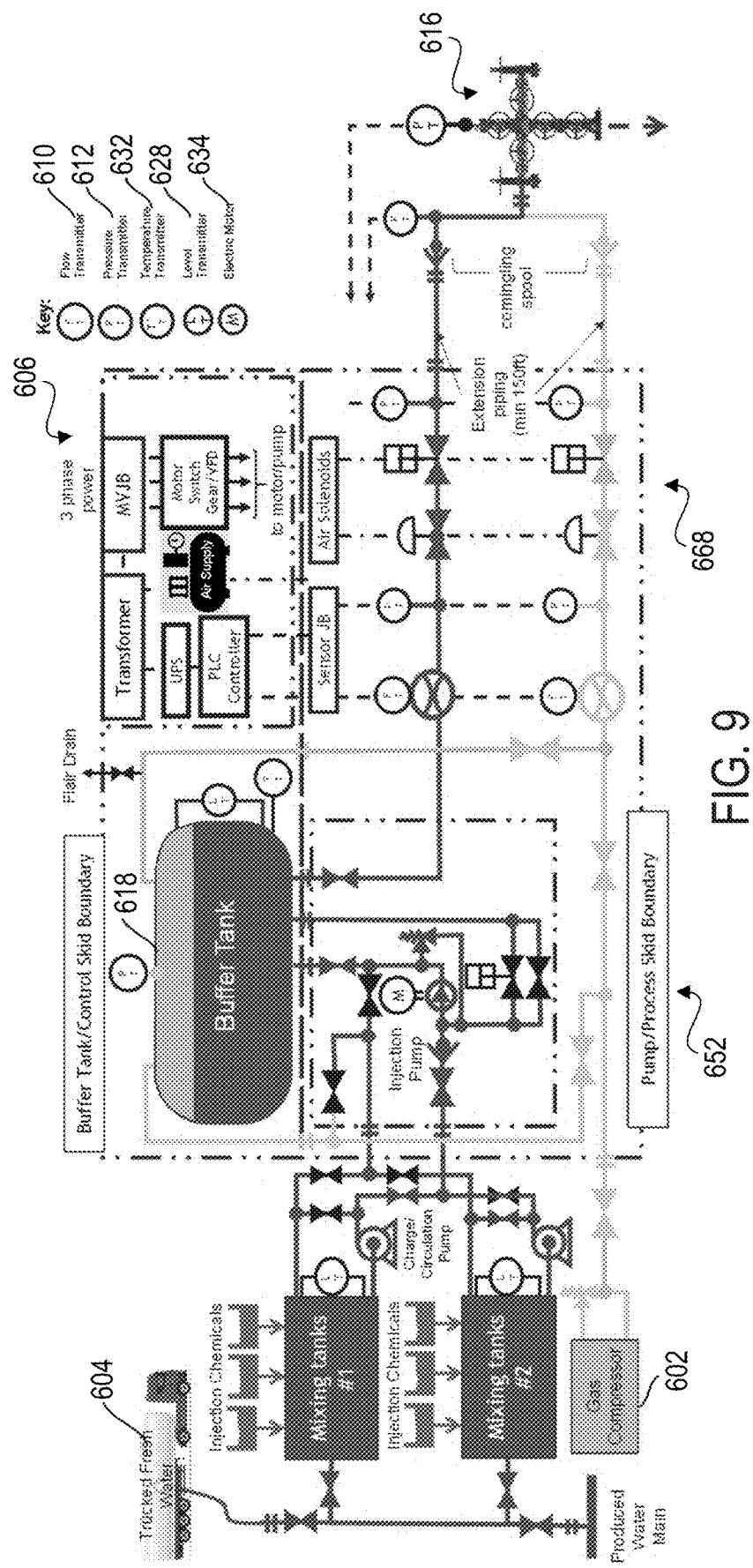
FIG. 9 illustrates an example mixed-phase injection mode of the injection system of FIG. 6 in accordance with aspects of the present disclosure.

In addition to optimizing the liquid content of the mixed-phase stream 110 to achieve and maintain injection with minimum energy usage, there may be a desired ratio of liquid and gas at the reservoir for two-phase permeability. The permeability of the reservoir will vary due to the various relative permeabilities to gas and liquid. According to the present disclosure, there may be target liquid-to-gas volume ratios for a particular completion reservoir. This can be achieved by affecting adjustments in surface injection pressure and regulating the gas and water injection rates at the surface. The mixed-phase gradient 110 can be a homogeneous gas-bubble-in-liquid flow gradient. A mixed-phase injection 110 may utilize a no-slip homogeneous bubble flow and very high velocities and liquid-volume-fractions. The mixed-phase injection 110 may be achieved by utilizing a mixer 654 (as shown in FIG. 8) along with an injection system (e.g., injection system 600 as illustrated in FIG. 9).

Figure 3:
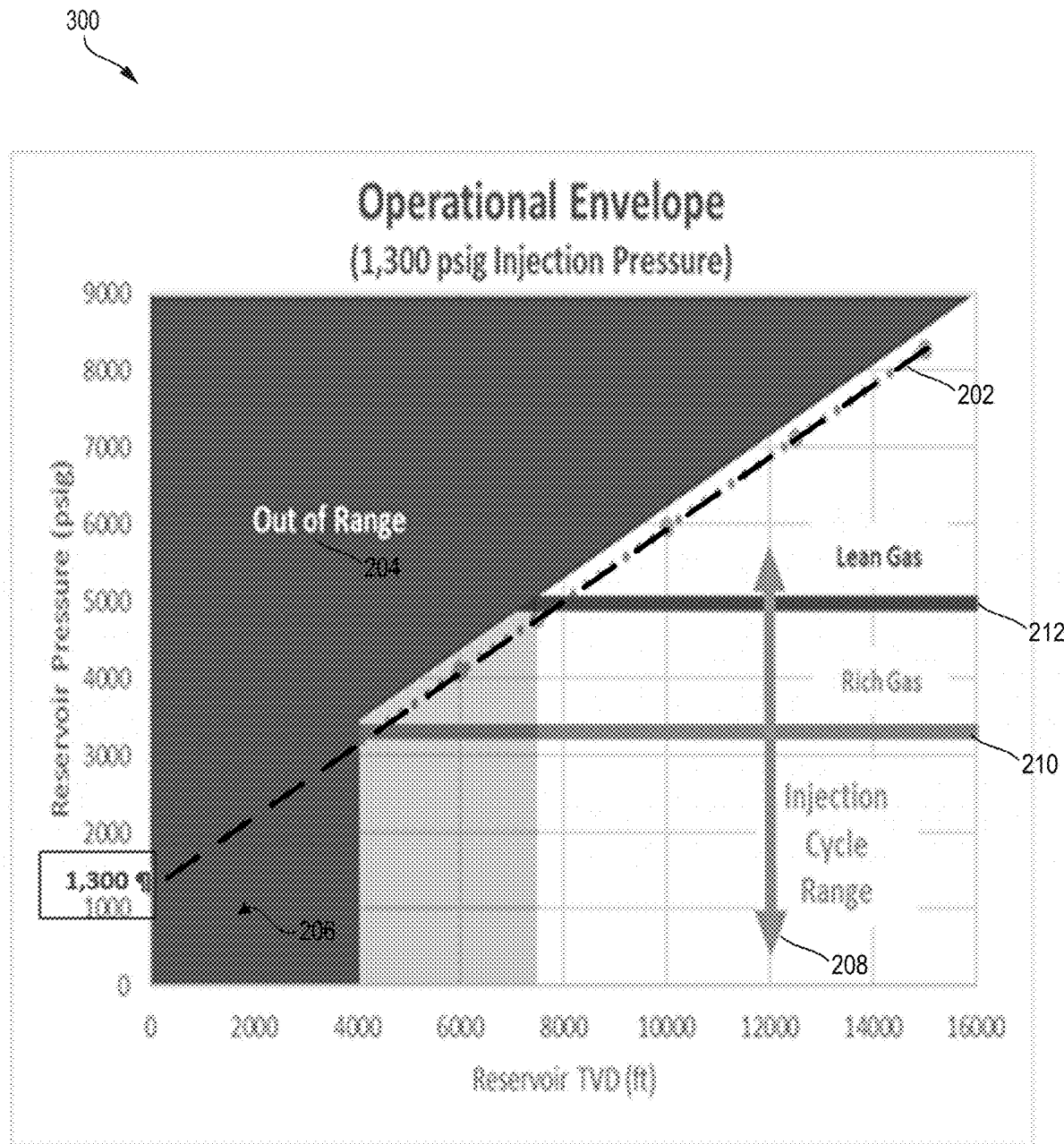
FIG. 3 illustrates an example operational envelope for a process delivered by a surface module in accordance with aspects of the present disclosure.

FIG. 3 illustrates an operational envelope for a process 300 delivered by a surface module of the presently disclosed technology, and which can be defined by an available surface pressure, depth of the reservoir, and density of the injected liquid and gas. In FIG. 3, the line 202 extending to the upper right from the example surface injection pressure of 1,300 psig is the hydrostatic gradient for a single-phase liquid brine. The region above that line can be out of range 204 for the process 300. This line moves up and down depending on the available surface injection pressure. The region in the lower left corner 206 (under the line 202 in grey) also illustrates an out-of-range zone for the process 300. The right side of the box is defined by a vertical line 208 intersecting a Rich Gas line 210. The Rich Gas line 210 and a Lean Gas line 212 vary with the composition of the injection gas and the reservoir oil. In this example, reservoir depths below 4000 feet, true vertical depth (TVD) are out of range.

The downhole pressure is directly dependent on the source gas pressure, densities, and reservoir depth. As illustrated in FIG. 3, shallow and high pressure reservoirs (e.g., above a hydrostatic gradient) are better candidates for this process 300 and module of the present disclosure. Still further, depleted reservoirs are also good candidates for application of the present technology.

FIG. 3 further illustrates an example implementation for a 12,000 foot deep reservoir having a 1,300 psig gas supply pressure. In this example, due to earlier extraction (e.g., production) activities, the reservoir pressure has been reduced to 500 psig. In some implementations, the well and reservoir can be recharged over time to a pressure above the minimum miscibility pressure for the gas and reservoir oil. If rich gas is utilized for the injection, the re-charge pressure can be approximately 4,000 psig, but if a lean gas such as methane is available and utilized, the re-charge pressure can be higher at approximately 5,500 psig.

Figure 4:
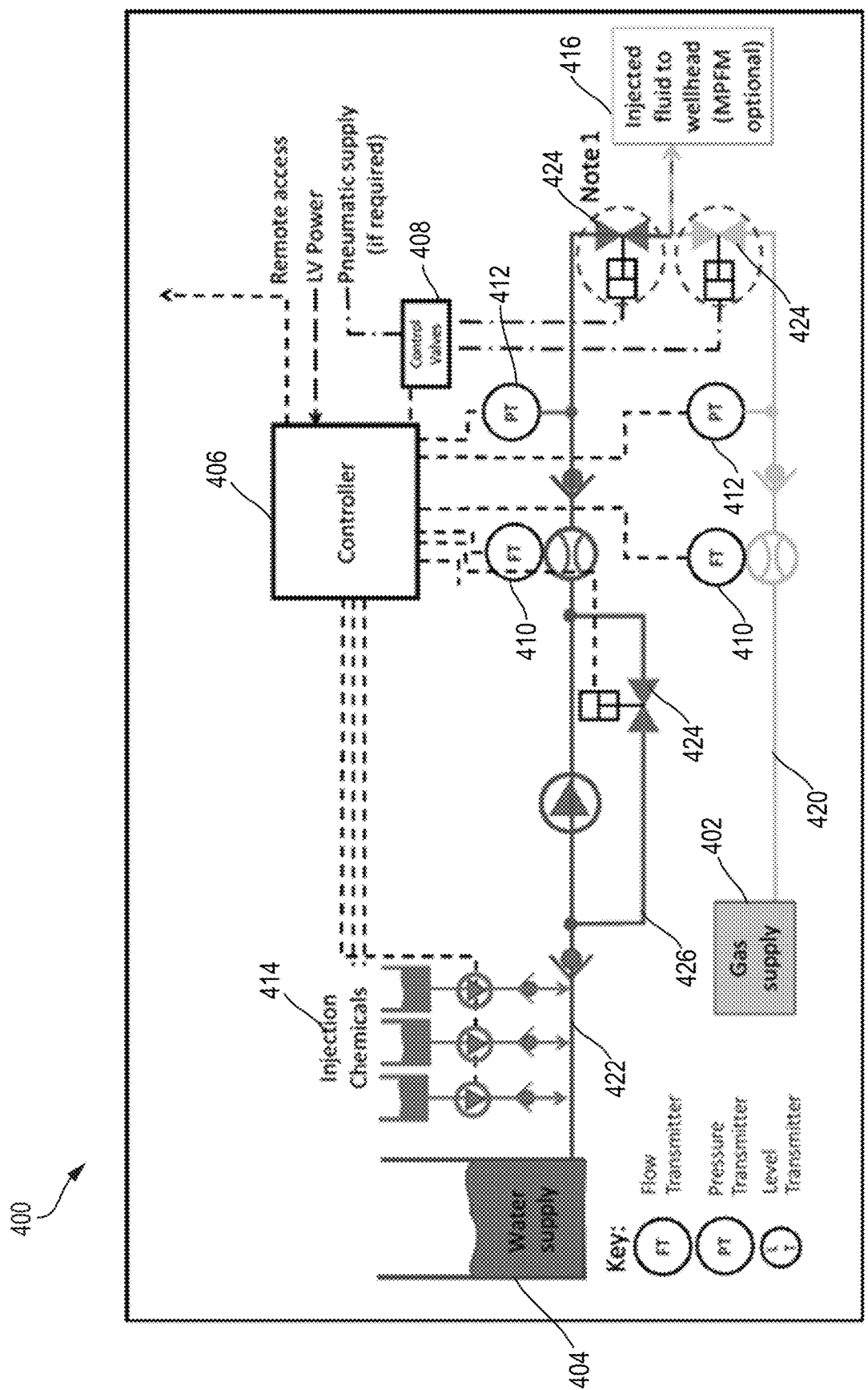
FIG. 4 illustrates an example system that utilizes compressed gas and pumped liquid that are variously combined in accordance with aspects of the present disclosure.

The presently disclosed technology and techniques utilize the injection of various combinations of liquid and gas to reduce surface pressure requirements for conducting Enhanced Oil Recovery processes. FIG. 4 illustrates an example system 400 that utilizes compressed gas 402 and pumped liquid 404 that are variously combined in accordance with aspects of the present disclosure. The system 400 is characterized by a direct supply of gas 402 and liquid 404 to the downhole injection line at a wellhead. In this implementation, compressed gas 402 and pumped liquid 404 can variously be combined, by surface equipment (e.g., skid-loaded), directly into an injection line 416 to the well as depicted in FIG. 4 and as described herein. The system 400 can further include a controller 406, control valves 408, flow transmitters 410, and pressure transmitters 412. The pumped liquid 404 can also be combined with injection chemicals 414 prior to being combined with the combined gas 402.

Figure 5:
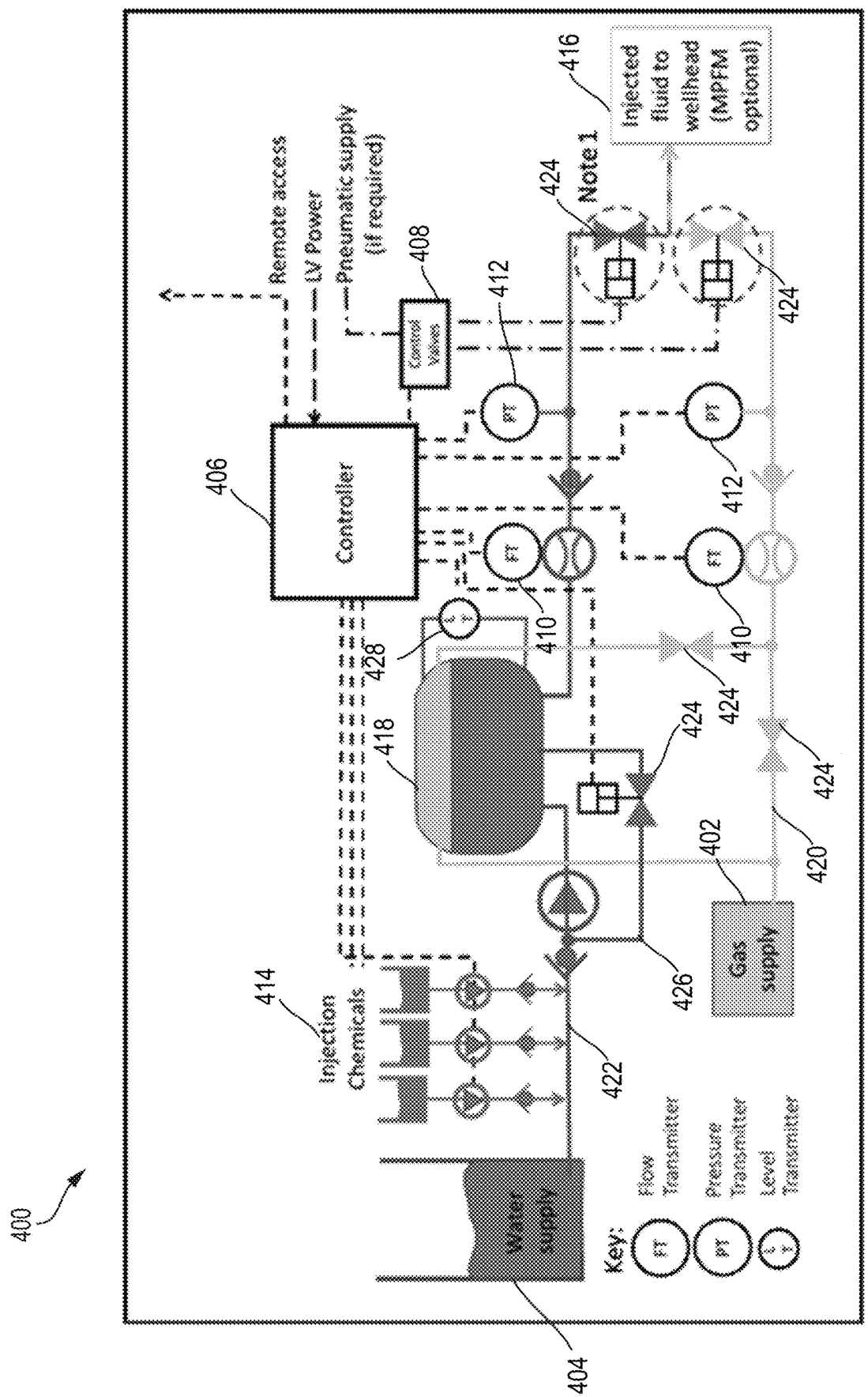
FIG. 5 illustrates an example system that utilizes compressed gas and pumped liquid that are combined in a buffer tank in accordance with aspects of the present disclosure.

FIG. 5 illustrates an example system 400 that utilizes compressed gas 402 and pumped liquid 404 that are commonly reservoired in a buffer tank 418 in accordance with aspects of the present disclosure. From the buffer tank 418, the gas 402 and liquid 404, in various combined proportions, are injected into the well 416 as depicted in FIG. 5.

In the prescribed process 400, when an applied mixed-phase fluid mixture reaches an injection sand-face downhole, a fluid (e.g., liquid 404/gas 402) mixture enters a fracture system of the reservoir. As this continues, the required injection pressure gradually increases, and responsively, the surface injected fluid density is commensurately increased as the reservoir pressure increases around the injection well.

In a further aspect of the presently disclosed technology, the controller 406 can monitor (advantageously, substantially continuously) the increasing wellbore injection pressure by extracting information from mixed-phase flow models or correlations, or a bottomhole pressure gauge when present. The injection density can be adjusted (e.g., by the controller 406) to maintain a target injection gas-liquid ratio within the constraints of available source gas pressure and capabilities of the system 400.

Further regarding the disclosed system and arrangement 400, in a first aspect, surface equipment can be utilized that is variously arranged and configured to provide an ability to inject a combination of gas 402 and liquid 404 into a subterranean well or wells, at or near the surface, for enhanced oil recovery (EOR). An aspect of the presently disclosed technology is that it requires significantly less surface injection pressure as compared to currently utilized high pressure compressed gas injection for similar enhanced oil recovery procedures. Still further, in addition to utilization in enhanced oil recovery, the technique can also be employed on storage/disposal wells used for subsurface gas/liquid storage or disposal.

The methods and arrangements 400 of the presently disclosed technology permit the use of lower wellhead injection pressure at the surface of a well by taking advantage of hydrostatic pressure derived from the weight of "slugs" of stacked liquid (e.g., variously mixed with gas or spaced apart by gas slugs) established in an injection column created within a well and that result in injection pressures downhole within the well that are greater than the gas pressure applied at the surface. Among other benefits, the system and process 400 require significantly less power when compared with currently utilized high pressure surface gas injection methods. The disclosed technique has utility in onshore oil wells; however, the principle is equally applicable to offshore surface and subsea wells.

In accordance with the teachings of the present disclosure, the pressure and flow rate of each element (e.g., gas 402 and/or liquid 404) can be controlled and monitored (e.g., with the controller 406) during an injection operation. The injection flow regime may be alternating slugs of gas 402 and slugs of liquid 404, or a mixed-phase combination of gas and liquid. Utilizing the buffer tank 418 can be more complex than without one, but utilizing the buffer tank 418 also requires lower peak power requirements and provides better pressure and flow control. A reduced peak power requirement is achieved by incorporating a smaller liquid pump with longer or continuous run time with the buffer tank 418 compared with starting and stopping a larger pump (e.g., without utilizing the buffer tank 418) to provided required volumes on demand. The buffer tank 418 can ensure the source injection pressure of both the gas 402 and liquid 404 are substantially the same and because of which better stability in the system 400 is derived. Hybrid versions of the two arrangements are possible; for example, configuring a gas line 420 to bypass the buffer tank 418 or chemical injection points 414 at more optimum locations in the system 400. The gas bypass option for the buffer tank 418 may be preferred to reduce the possibility of liquid carry over into the gas injection line 420. Another benefit is that the surface equipment can be skid-mounted, or otherwise located proximate the injection well.

On-site, inputs and resources can include: (1) a gas supply with sufficient volume (e.g., flowrate) and pressure to support the injection process at the well of concern; (2) a water supply (e.g., produced water from the field) with sufficient volume (e.g., flowrate) and pressure to supply the liquid pump inlet requirement; (3) electrical power for liquid pump(s) and controls; (4) advantageous chemical additives for the liquid flow stream (e.g., including surfactant), corrosion inhibitor, and hydrate inhibitor; (5) pneumatic supply (if required/available); and (6) internet or other connectivity for remote control and monitoring of the system and process 400.

In some implementations, the presently disclosed system 400 can utilize natural gas supplied at the field. Other gases such as carbon dioxide or nitrogen can also be used for specific applications. If the gas supply 402 in the field has insufficient pressure, an optionally included booster compressor can be used. If the water supply 404 in the field has insufficient pressure to meet the Net Positive Suction Head (NPSH) requirement of the liquid pump, then a booster pump can be provided and utilized. If the water supply 404 in the field has insufficient volume/flow rate to meet the injection requirements, then additional water can be added as long as it is compatible with the reservoir and other aspects of the prescribed EOR procedure. If sufficient electrical power is not available at the well site, additional portable power generation is provided and utilized.

Advantageously, a natural gas or diesel driven portable generator can be supplied where required. Concerning desirable chemical additives 414, surfactant can be utilized to support the EOR process and corrosion inhibitors and hydrate inhibitors can be used as required. The supply of pneumatic pressure will only be required if pneumatic controls are used as an alternative to electrical or hydraulic controls/actuation at the well site.

Regarding system components that support the disclosed system and method 400, the system 400 can include a liquid pump to boost the water and chemical supply to the required injection pressure. The buffer tank 418 of the system 400, which can advantageously be a fabricated pressure vessel, for example, can be 600 # ANSI rated. Process piping is used that is sized, pressure rated, and constructed of appropriate material suited to the specific fluid/well application. Single phase flow meters 410 can be provided on the gas and liquid injection lines 420, 422 to monitor flow. Mixed-phase flowmeters 410 may also be included on the discharge of the system 400 to measure the flowrate of the combined gas/liquid flow 416. Actuable process valves 424 (e.g., open, closed, and/or control valves) are provided to control the process 400. Additional manual valves can be supplied for maintenance, but which are not shown in the Figures. A pump recycle line 426 can be included that facilitates optimal sizing and operation of the pump.

Instruments, such as pressure and level transmitters 412, 428, are provided for monitoring and that are compatible with the selected control system 406. Temperature transmitters are also included where advantageous. The controller 406 for local control of the equipment of the system 400 is provided; typically, a PLC type controller with remote access, but other PC based/DCS/SCADA type controllers can also be used where appropriate. Chemical pumps are provided for pumping surfactant, corrosion inhibitor, and hydrate inhibitor (among others) and which are sized for their duty with correct material selection. Check valves are provided to prevent back flow in the system 400 and relief valves are provided to prevent over pressurization of system 400. Emergency stops for safety are provided locally, and advantageously on the skid arrangement, if utilized. A base/frame/skid/plinth is fabricated for the system 400 to support and transport the active system components, which are modularized for most efficient packaging.

Regarding the system 400 components described herein, the disclosed type of liquid pump drive can take the form of one or more of multiple appropriate drive systems useable as the liquid pump drive in the EOR environment. In one aspect, the pump drive can be an electric motor having constant speed and start and stop control. Alternatively, an electric motor with variable speed drive can be utilized. Still further, an electric motor having constant speed and a torque converter can be implemented. Further still, a gas/dual fuel internal combustion engine can be used as the pump drive. The liquid pump selection can be a base case design that uses a displacement pump or another type of pump can also be used such as multistage centrifugal, twin screw pump and gear pumps.

Regarding the prescribed system components and their assemblage into the disclosed arrangements, dimensions and weight modules (e.g., assembled base/frame/skid/plinth) can be advantageously configured for road transport by truck using ISO shipping container guidelines, typically with the ability to be skid-mounted and fitting inside a standard shipping container for transport to the wellsite.

Example embodiments have been disclosed that are within the scope of this disclosure. Other, different and/or broader embodiments are also within the scope of this disclosure, some of which may include elements of one example embodiment combined with elements of another example embodiment (to the extent combinable), or subsets of elements of one specific example embodiment.

Figure 6:
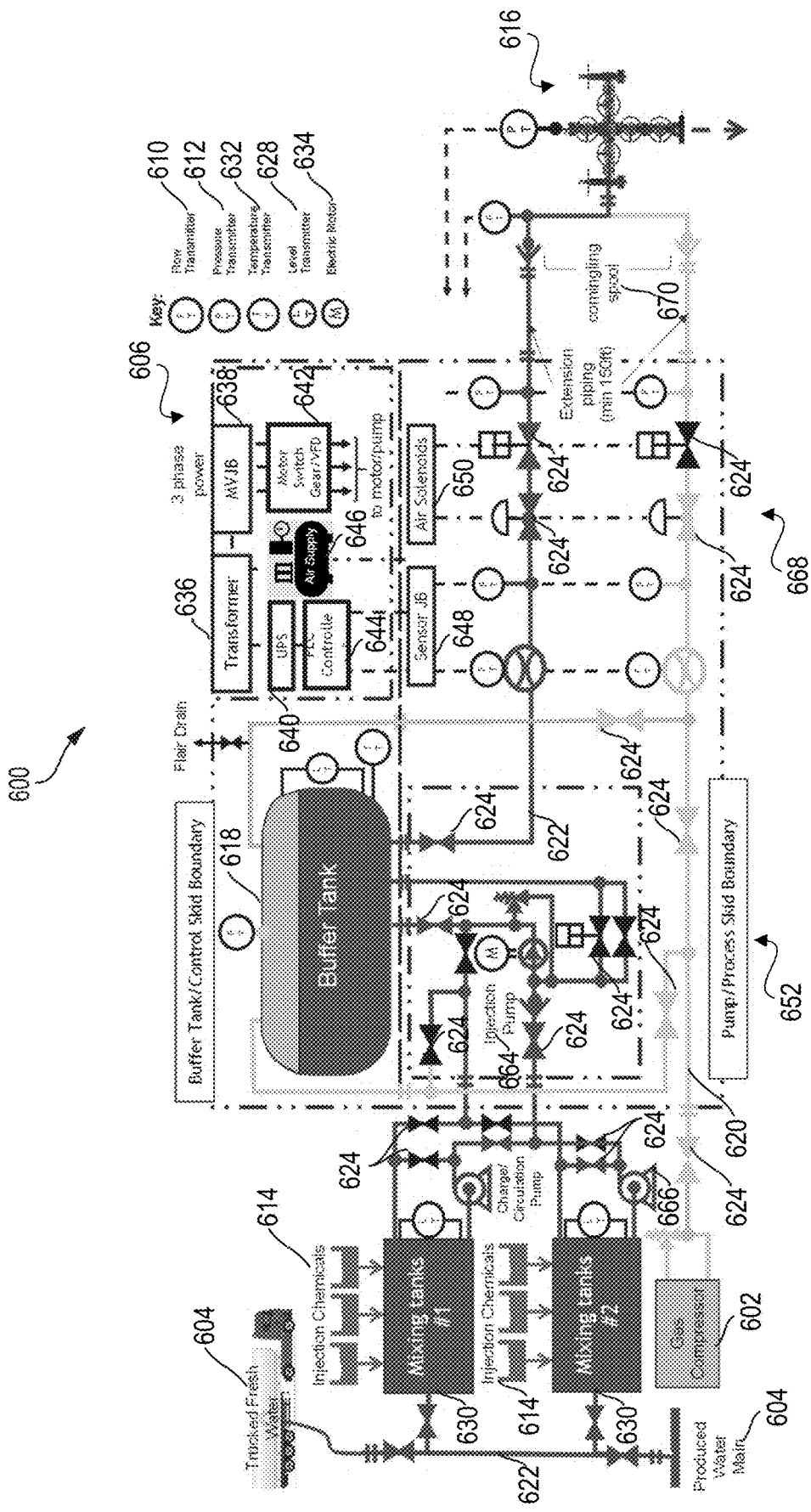
FIG. 6 illustrates an example of a mixed-phase injection system in accordance with aspects of the present disclosure.

FIG. 6 illustrates an example injection system 600 in accordance with aspects of the present disclosure. In some implementations, the injection system 600 can include a controller system 606, a buffer tank 618, a pump assembly 652, and a fluid dispensing system 668 (e.g., including actuable process valves 624 (e.g., open, closed, and/or control valves) and transmitters (e.g., a flow transmitter 610, a pressure transmitter 612, a level transmitter 628, and a temperature transmitter 632)). The injection system 600 can also be configured to receive liquid 604 via mixing tanks 630 from storage containers or reservoirs such as a trucked fresh water and produced water mains. The mixing tanks 630 can also be configured to mix liquid 604 with injection chemicals 614, as described herein (e.g., 2000 barrels/min). The mixing tanks 630 can further be equipped with level transmitters 628 to determine the level of the mixed solution (e.g., liquid 604 and the injection chemicals 614) within the mixing tanks 630. A charge/circulation pump 666 can also be utilized by the injection system 600 to charge or circulate the mixed solution/liquid 604 out of the mixing tanks 630.

As used in the present disclosure, liquid 604 can include liquid only or liquid mixed with the injection chemicals 614. Valves 624 can also be arranged in the injection system 600 to control the flow of liquid 604 from the mixing tanks 614 and into the buffer tank 618. Liquid 604 can also flow throughout the injection system 600 via liquid lines 622. Gas 602 can also be received by the injection system 600 from a gas compressor or a gas storage unit. Gas 602 can be routed to the buffer tank 618 via gas lines 620 and controlled by the controller system 606 by utilizing the valves 624 distributed throughout the injection system 600. Gas 602 can be directed by the injection system 600 to the buffer tank 618 or directly to an injection well 616.

The pump assembly 652 of the injection system 600 can include an electric motor 634, an injection pump 664, and valves 624 that control the amount, pressure, and velocity of liquid 604 that flows into the buffer tank 618. The injection pump 664 of the pump assembly 652 can be configured to stabilize the buffer tank 618 by continuously filling the buffer tank 618 while the injection system 600 depletes liquid 604 from the buffer tank 618. For example, as the injection system 600 utilizes liquid 604 during the injection process, the amount of liquid 604 in the buffer tank 618 decreases accordingly. As liquid 604 or gas 602 is depleted from the buffer tank 618, the pressure within the buffer tank 618 will fluctuate accordingly. To counter this, as liquid 604 is expended from the buffer tank 618, the injection pump 664 can correspondingly inject more liquid 604 into the buffer tank 618 until a desired amount or pressure is reached.

The buffer tank 618 of the injection system 600 can be configured to store liquid 604 and gas 602 at substantially equal pressure, but various relative quantities. For example, the controller system 606 can control the valves 624, the pump assembly 652, and gas compressor to migrate a predetermined amount of liquid 604 and gas 602 into the buffer tank 618. The buffer tank 618 can also be configured to utilize a level transmitter 628 to notify the injection system 600 of the current level of liquid 604 and/or gas 604 within the buffer tank 618. The buffer tank 618 can further utilize a temperature transmitter 632 to determine the temperature of the liquid 604 stored inside the buffer tank 618. Though the buffer tank 618 is shown in FIG. 6 as having a temperature transmitter 632 proximate to the liquid 604, a temperature transmitter 632 (e.g., a temperature sensor) can be positioned within the buffer tank 618, proximate to the gas 604 to measure the temperature of the gas 604. The buffer tank 619 of the injection system 600 can further be configured to include a pressure transmitter 612 to determine the pressure of the liquid 604 and the gas 602.

The controller system 606 of the injection system 600 can include a transformer 636, a medium voltage junction box (MVJB) 638 (e.g., a MVJB with 3-phase power, 100 KVA, 3 PH, 480V), an uninterruptible power source (UPS) 640, a motor switch gear/variable frequency drive (VFD) 642, a programmable logic controller (PLC) controller 644, and an air supply 646 that can be configured to control air solenoids 650, which actuate valves 624. The controller system 606 can further receive data from sensors 648 relating to the liquid 604 in the liquid line 622 and the gas 602 in the gas line 620. The sensors 648 can include flow transmitters 610 (e.g., which determines the flow rate of liquid 604 in the liquid line 622 and gas 602 in the gas line 620), and pressure transmitters 612 (e.g., which determines the pressure of liquid 604 in the liquid line 622 and gas 602 in the gas line 620).

The controller system 606 can further include various modes of operation including a monitoring mode, a maintenance mode, an operating mode, and an engineering mode. The monitoring mode can include monitoring all of the transmitters 610, 612, 632, 628 and providing local and remote monitoring services. Maintenance mode can include filling the buffer tank 618 with liquid 604, circulating liquid 604 back into the mixing tank 630, and performing a leak test. Operating mode can include fully automating operation of the injection system 600 to provide alternating flow from gas 602 and liquid 604 skid outlets with full monitoring of sensors and pump operation, start/stop injection functions, tuning parameters (e.g., tuning gas 602 and liquid 604 slug durations and flow rates), utilizing alarm definitions (e.g., HiHi alarm, 80% buffer tank level, pump stops on ascending level; Hi alarm, 70% buffer tank level, recycle valve opens on ascending level, pump starts on descending level; normal operating level, 60% buffer tank level; Lo alarm, 30% buffer tank level, gas and liquid discharge valves shut; and LoLo alarm, 20% buffer tank level, pump shutdown), and permissives (e.g., at startup, determining that the buffer tank level is within range, gas supply pressure is within range, valves 624 are in their correct positions, low buffer tank levels, low discharge pressure for gas 602 and liquid 604, and low gas supply pressures). Engineering mode can include being password protected, providing local and remote access, providing full manual control of control functions, modifying set points and alarms, and providing emergency shutdown functions.

Figure 10:
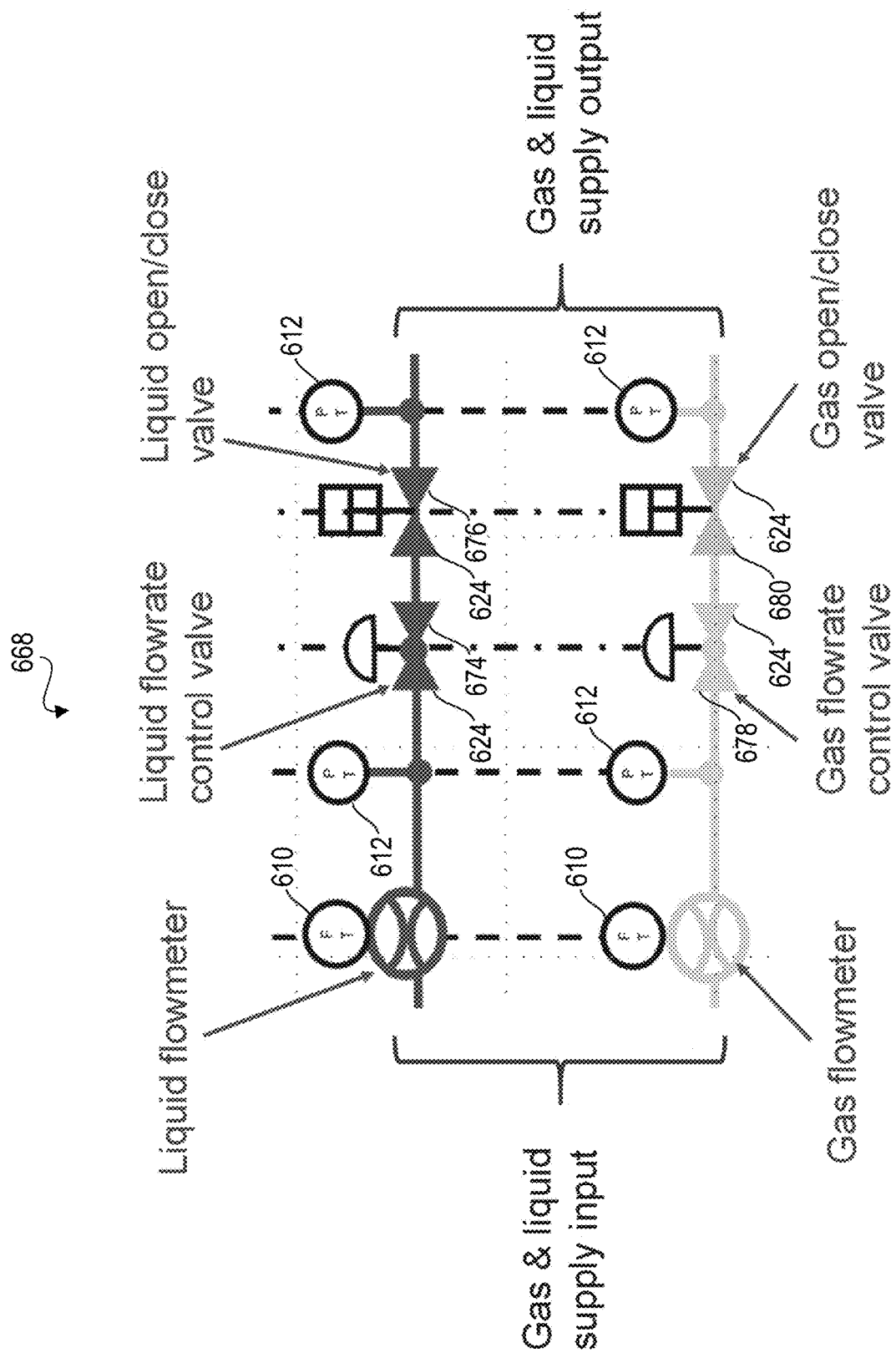
FIG. 10 illustrates an example fluid dispensing system of an injection system configured in accordance with aspects of the present disclosure.

By determining the flow rate and pressure of liquid 604 in the liquid line 622 and gas 602 in the gas line 620, the controller system 606 of the injection system 600 can compare the measured flow and pressure rates to then be adjusted accordingly by the fluid dispensing system 668. For example, if the measured flow and pressure rates are too high, the fluid dispensing system 668 of the injection system 600 can activate the air solenoids 650 to close the valves 624, thereby lowering the flow and pressure rates, until desired flow and pressure rates are reached. Referring to FIG. 10, the fluid dispensing system 668 can include flow rate transmitters 610 (e.g., flow rate sensors), pressure transmitters 612 (e.g., pressure sensors), and valves 624. The valves 624, as shown in FIG. 10, can include a liquid flow rate control valve 674, a liquid on/off valve 676, a gas flow rate control valve 678, and a gas on/off valve 680. The liquid flow rate control valve 674 can control the flow rate of the liquid 604 in the liquid line 622 of the injection system 600. The gas flow rate control valve 678 can control the flow rate of the gas 602 in the gas line 620 of the injection system 600. The liquid on/off valve 676 can be configured to open or close the liquid line 622 of the injection system 600. The gas on/off valve 680 can be configured to open or close the gas line 620 of the injection system 600. In some implementations, the liquid on/off valve 676 and the gas on/off valve 680 can alternate their respective positions. For example, when the controller system 606 opens the liquid on/off valve 676, the controller system 606 closes the gas on/off valve 680. Also, when the controller system 606 closes the liquid on/off valve 676, the controller system 606 opens the gas on/off valve 680. As shown in FIG. 6, air solenoids 650 may be utilized to control the liquid flow rate control valve 674, the liquid on/off valve 676, the gas flow rate control valve 678, and the gas on/off valve. It is also envisioned that other types of actuators and controllers (e.g., pneumatic, electrical, and mechanical actuators and controllers) can control the opening and closing positions of the liquid flow rate control valve 674, the liquid on/off valve 676, the gas flow rate control valve 678, and the gas on/off valve.

Examples of liquid rates for a 7×2⅞ inch annulus, with a 5.373 inch eq. inner diameter (ID), for 800 psig and 600 psig are provided below in Tables 1 and 2, respectively:

TABLE 1

| 800 psig surface pressure, 3 MMscf/day | | | | | | |
|---|---|---|---|---|---|---|
| Liquid Rate (BWPD) | Liquid Rate (gpm) | Mixture Velocity in Well (ft/sec) | Mixture Velocity 30 inch ID Pipe (ft/sec) | Liquid During Slug Injection (gpm) | Slug Injection (sec) | Bubble Injection (sec) |
| 1.492 | 43 | 4.83 | 15.6 | 341 | 9.5 | 64 |
| 2.172 | 63 | 5.11 | 16.5 | 360 | 9.0 | 44 |
| 2.853 | 83 | 5.39 | 17.4 | 380 | 8.5 | 30 |

TABLE 2

| 600 psig surface pressure, 2 MMscf/day | | | | | | |
|---|---|---|---|---|---|---|
| Liquid Rate (BWPD) | Liquid Rate (gpm) | Mixture Velocity in Well (ft/sec) | Mixture Velocity 30 inch ID Pipe (ft/sec) | Liquid During Slug Injection (gpm) | Slug Injection (sec) | Bubble Injection (sec) |
| 1.000 | 30 | 4.17 | 13.5 | 295 | 11.0 | 99 |
| 4.000 | 117 | 5.4 | 17.4 | 382 | 8.5 | 19 |

The liquid slug can include a minimum stable slug upward flow of 32-64 D, with a 46 ft. slug length in one embodiment being approximately 103 D. The gas bubble can be determined by a material balance.

The injection system 600 can further include a comingling spool 670 that can be configured to mix/alternate liquid 604 and gas 602 that is then directed to the wellhead 616. Pressures at the comingling spool 670 and the wellhead 616 can be measured by utilizing pressure transmitters 612.

Figure 7:
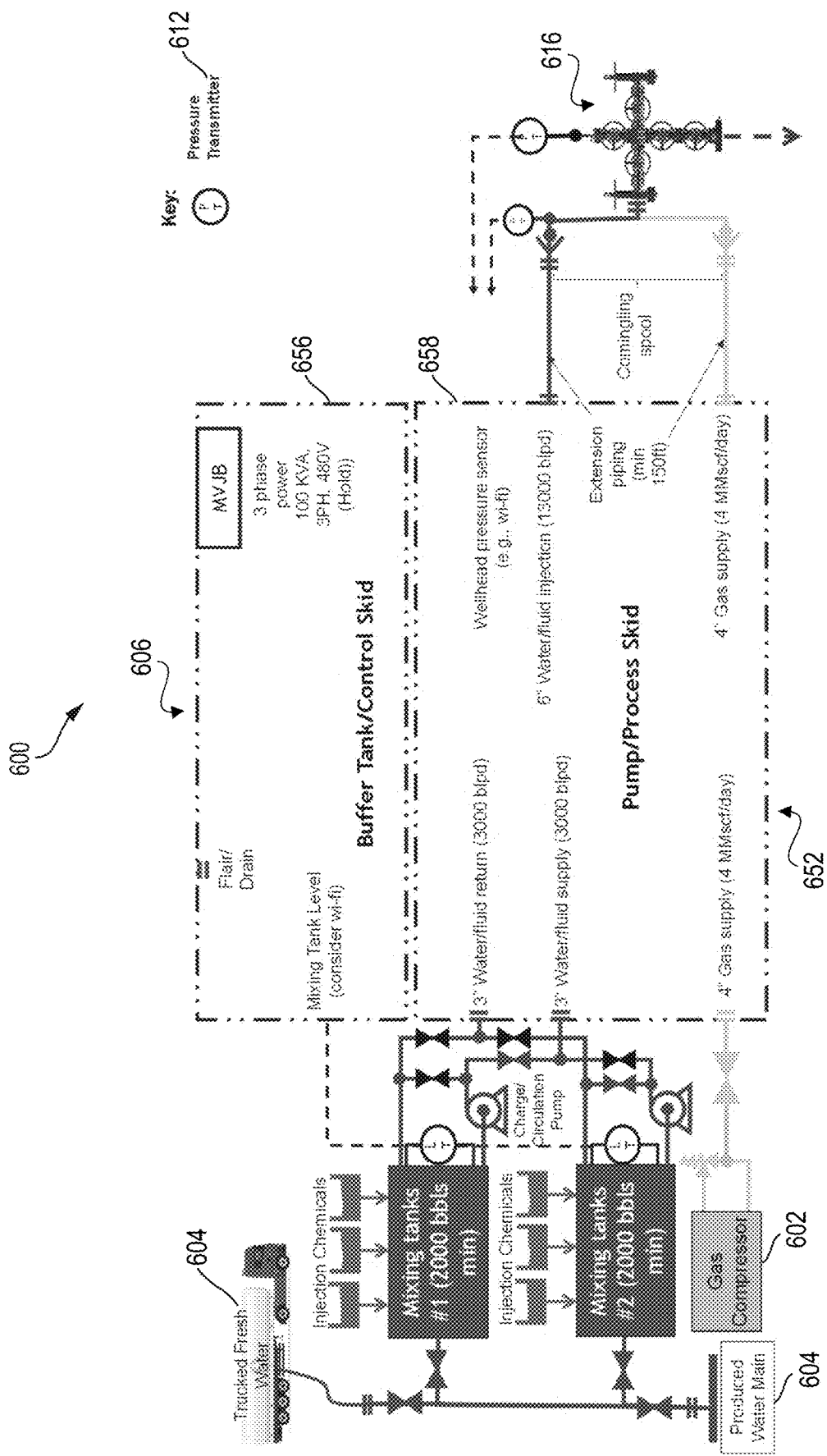
FIG. 7 illustrates an example of the mixed-phase injection system of FIG. 6 denoting corresponding skids on which various components can be positioned in accordance with aspects of the present disclosure.

FIG. 7 illustrates an example of the injection system 600 of FIG. 6 along with corresponding skids 656, 658 in accordance with aspects of the present disclosure. For example, the skid 656 can be configured to include the buffer tank 618 and the controller system 606 of the injection system 600, while the skid 658 can be configured to include the pump assembly 652 and the fluid dispensing system 668 of the injection system 600. In some implementations, the level of mixed solution/liquid in the mixing tanks 630 (e.g., measured by the level transmitter 628) can be transmitted (e.g., Wi-Fi, Bluetooth, etc.) to the controller system 606 of the injection system 600 in the skid 656.

The pump assembly 652 of the injection system 600 can include piping (e.g., 4 inch) and utilize the injection pump 664 and valves 624 to facilitate water/fluid return (e.g., 3000 blpd) and water/fluid supply (e.g., 3000 blpd). The pump assembly 652 can further include piping (e.g., 6 inch) for water/fluid injection (e.g., 13,000 blpd) to the comingling spool 670. The pump assembly 652 of the injection system 600 can further include 4 inch piping to have access to a gas supply (e.g., gas 602 from a gas compressor) (4 MMscf/day) and to have provide gas 602 (e.g., 4 MMscf/day) to the comingling spool 670. In some implementations, wellhead pressure measured at the wellhead 616 by pressure transmitter 612 can be received by pump assembly 652/fluid dispensing system 668 of skid 658.

FIG. 8 illustrates an example of the injection system 600 of FIG. 6 along with a mixer 654 and FIG. 9 illustrates an example mixed-phase injection mode in accordance with aspects of the present disclosure. Mixer 654 of the injection system 600 can alternate slugs of liquid 604 and gas 602, or premix the liquid 604 and gas 602 prior to being injected into the wellhead 616. The injection system 600 can further include a mixed-phase meter 672 between the mixer 654 and the wellhead 616 to measure flow rates of the liquid 604 and gas 602. The mixed-phase meter 672 can be a specialized flow meter that is configured to measure the flow rate of the premixed liquid 604 and gas 602. During the mixed-phase injection mode, as shown in FIG. 9, the injection system 600 can include and utilize the mixer 654 and/or the mixed-phase meter 672.

Figure 11:
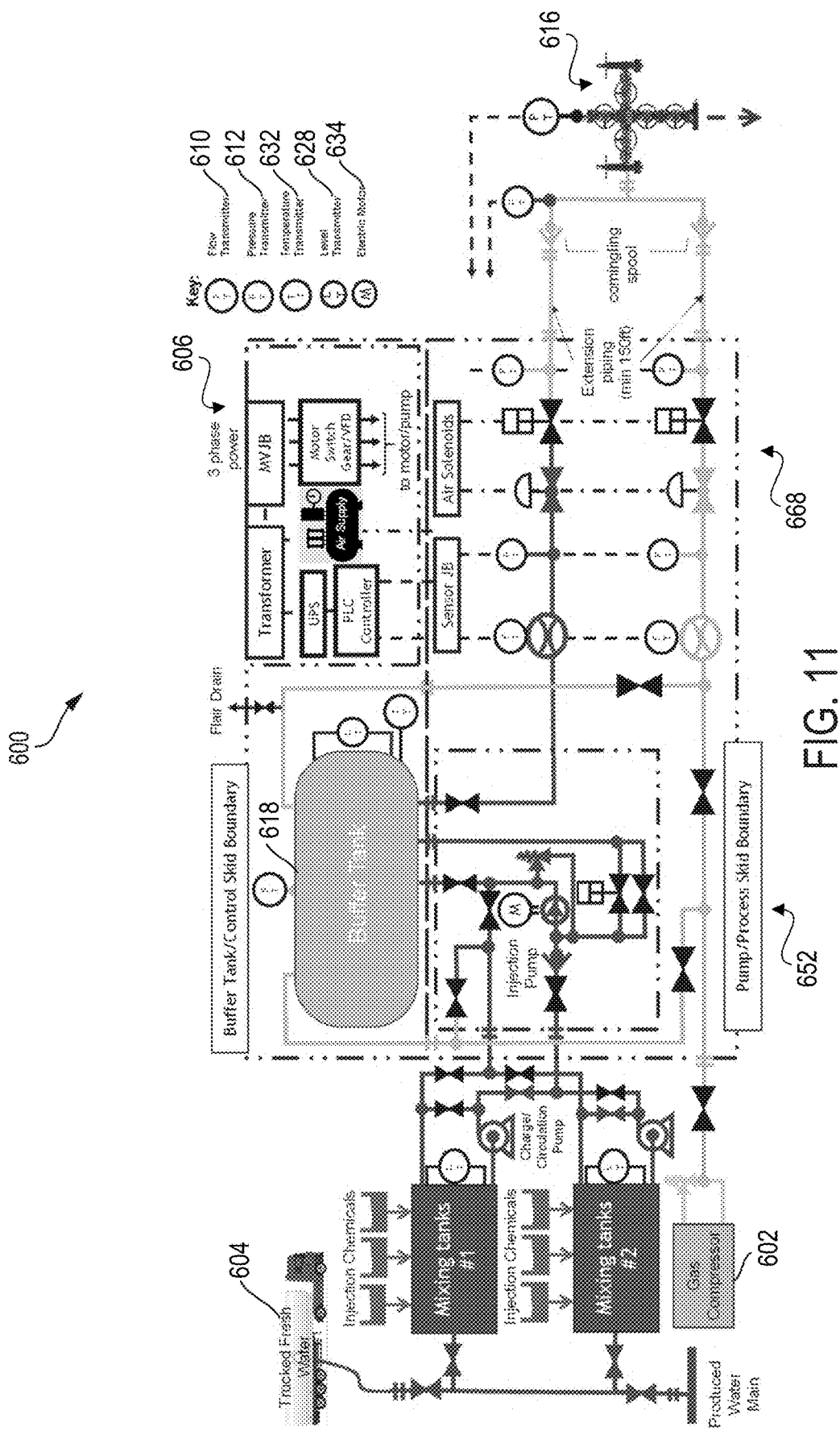
FIGS. 11-19 illustrate example configurations, assumed in various sequences, of an injection system configured in accordance with aspects of the present disclosure, exemplarily operating in a rapidly alternating phase mode.
Figure 12:
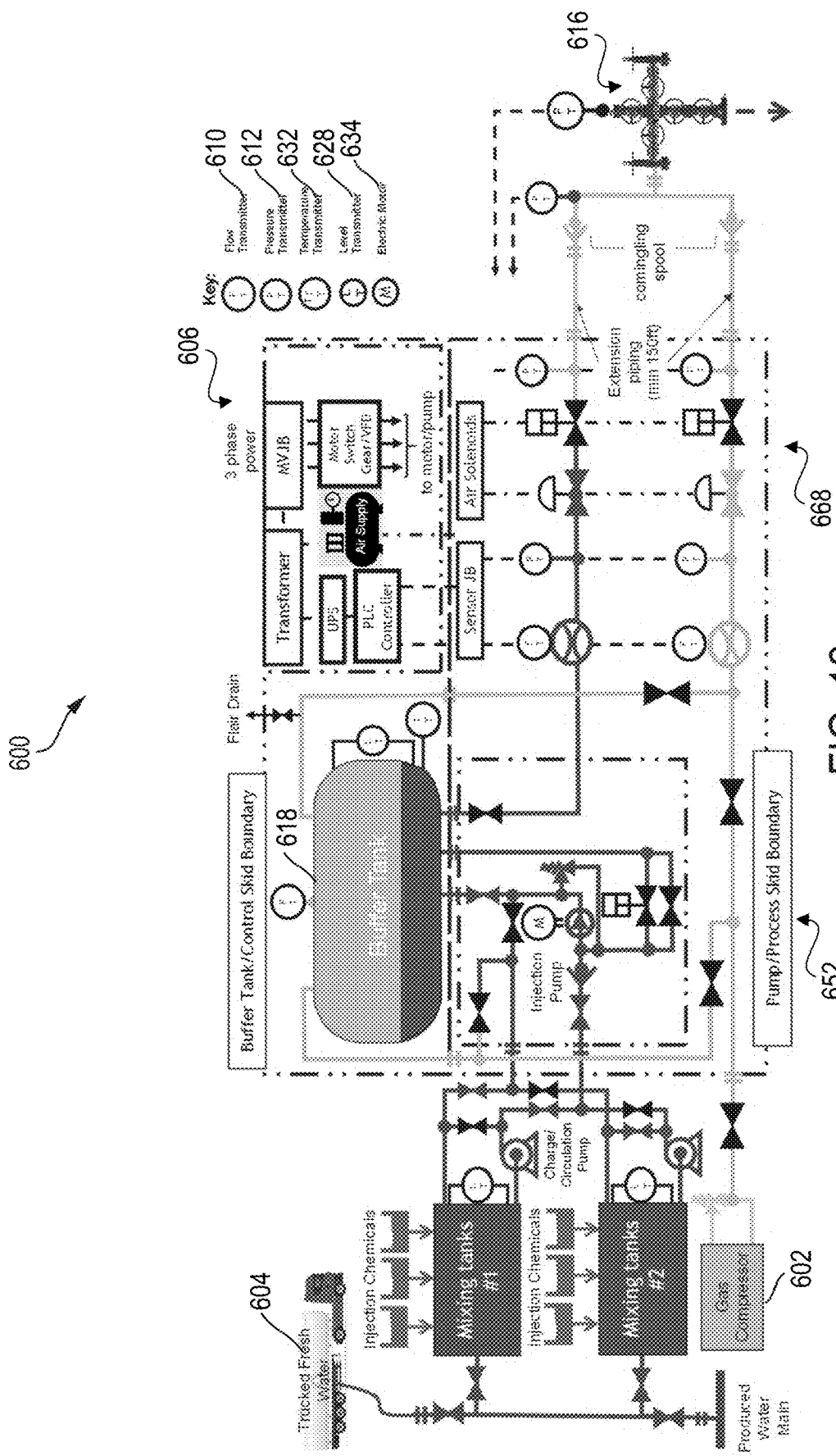
Figure 13:
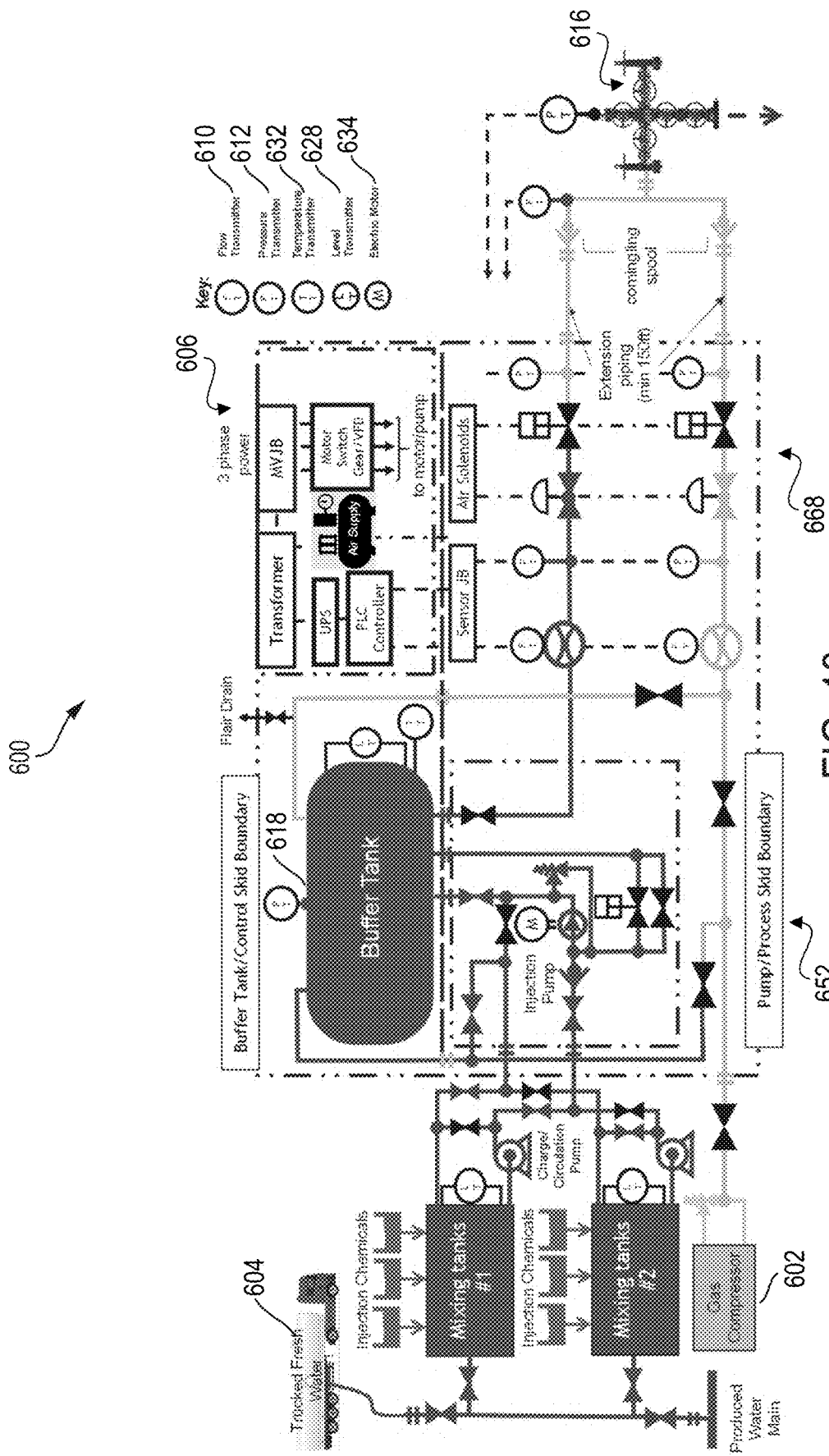
Figure 14:
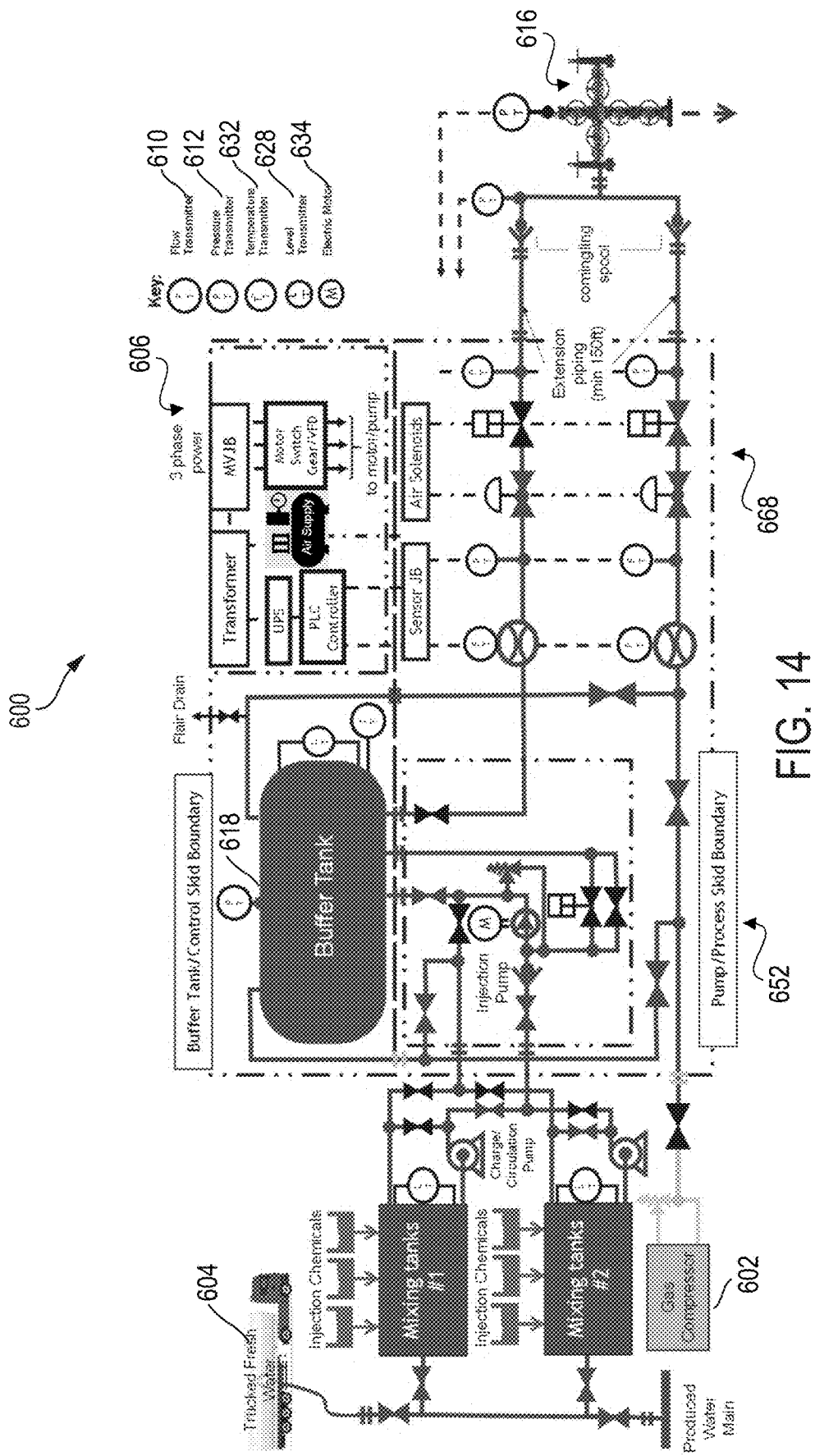
Figure 15:
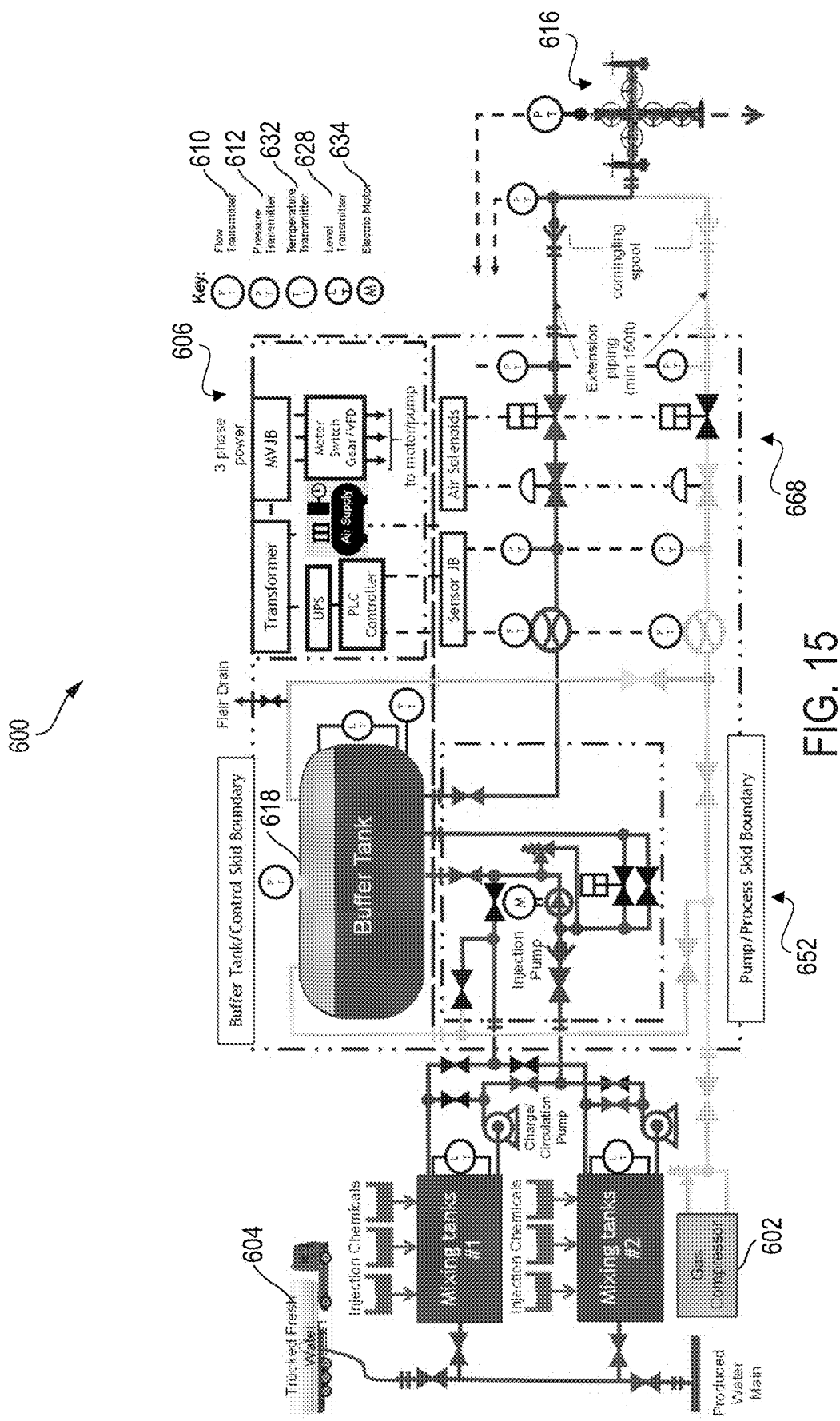
Figure 16:
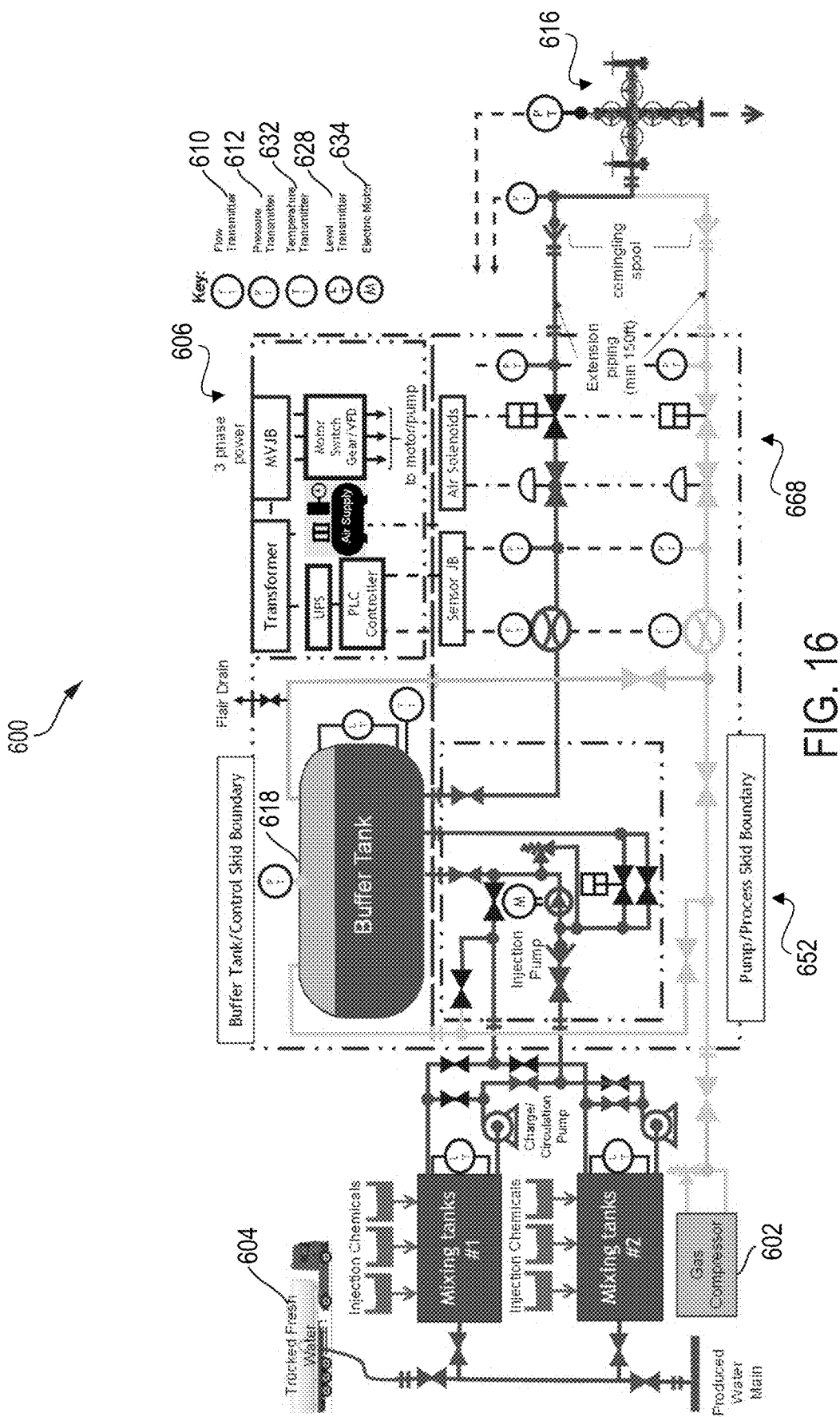
Figure 17:
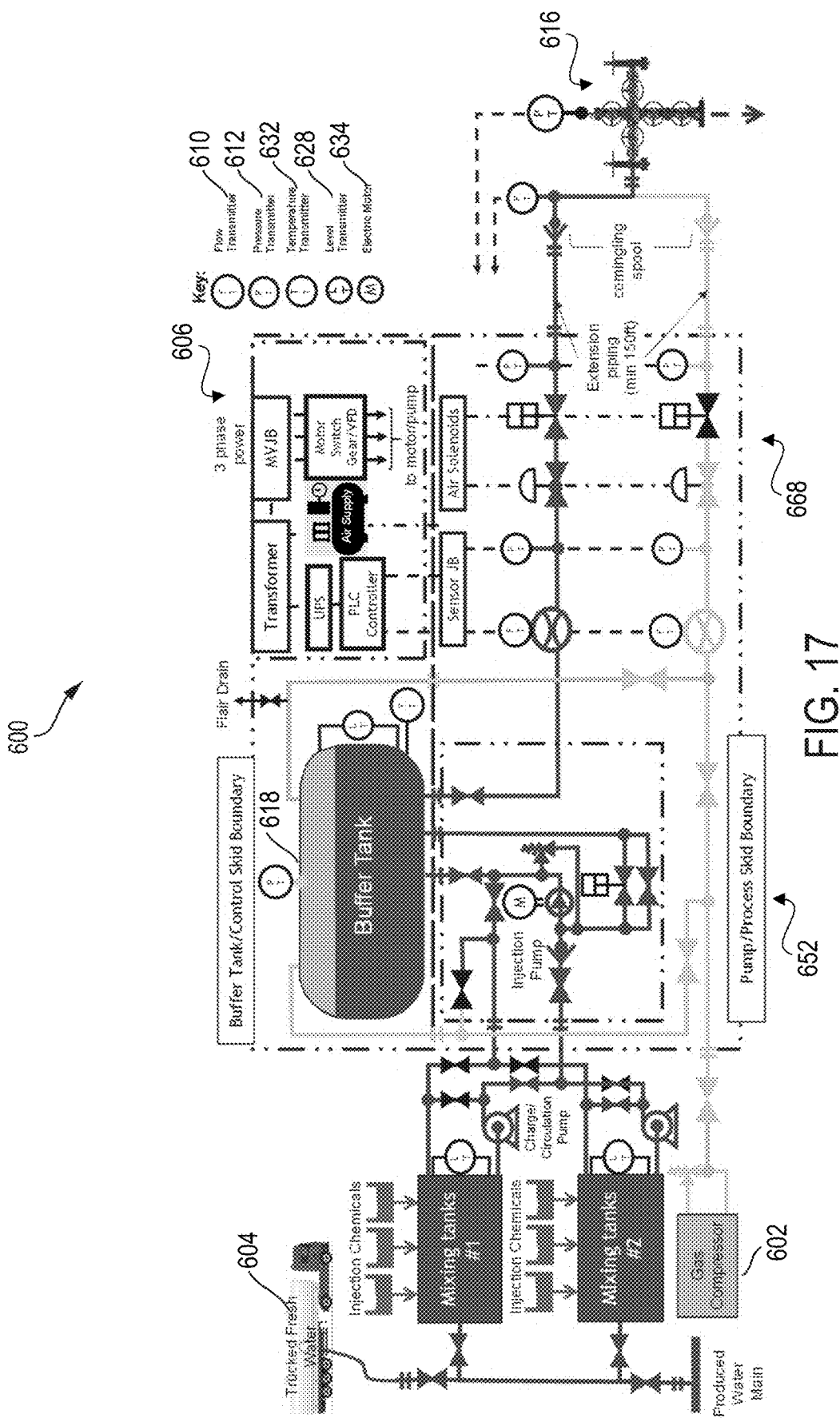
Figure 18:
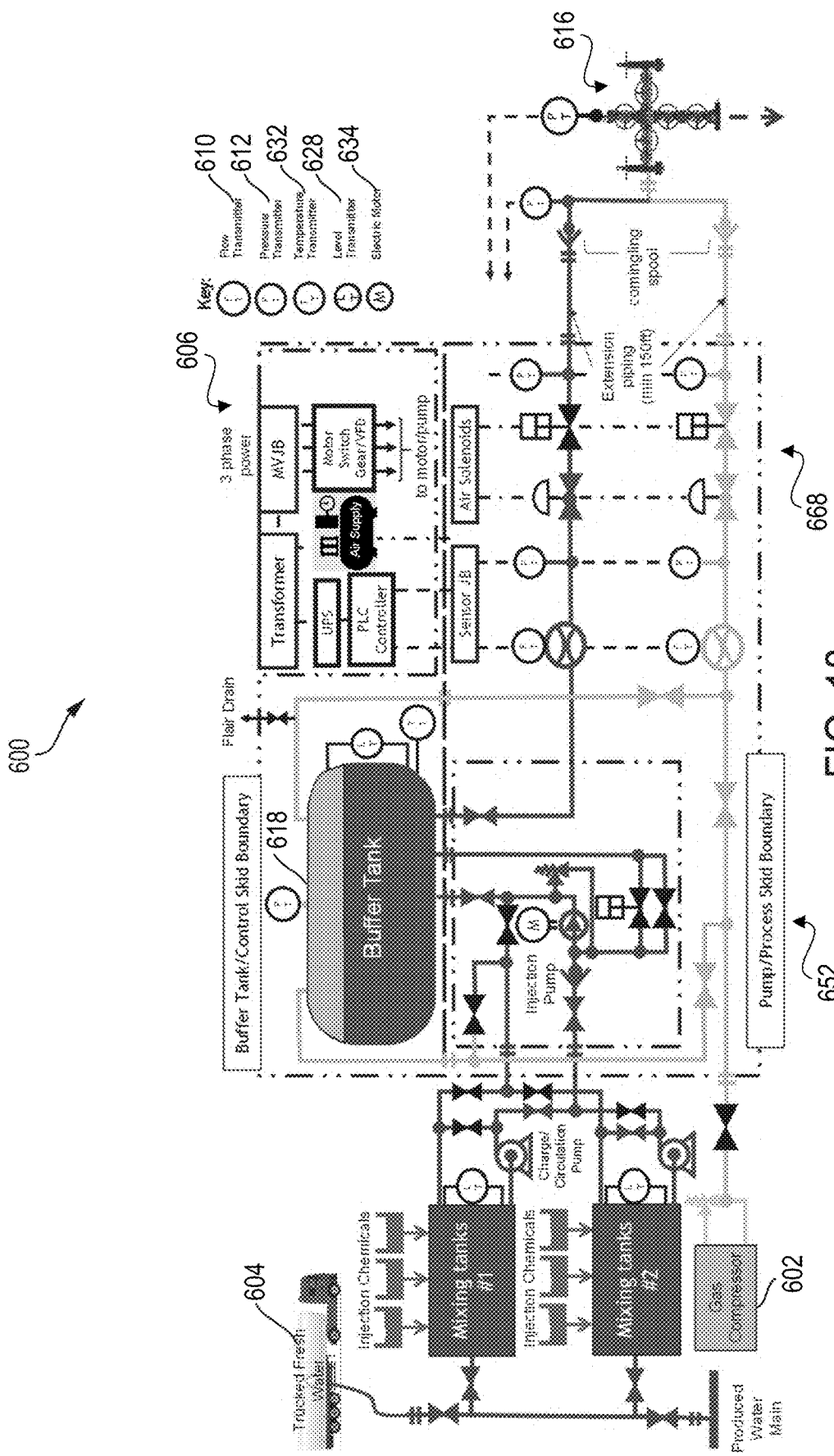
Figure 19:
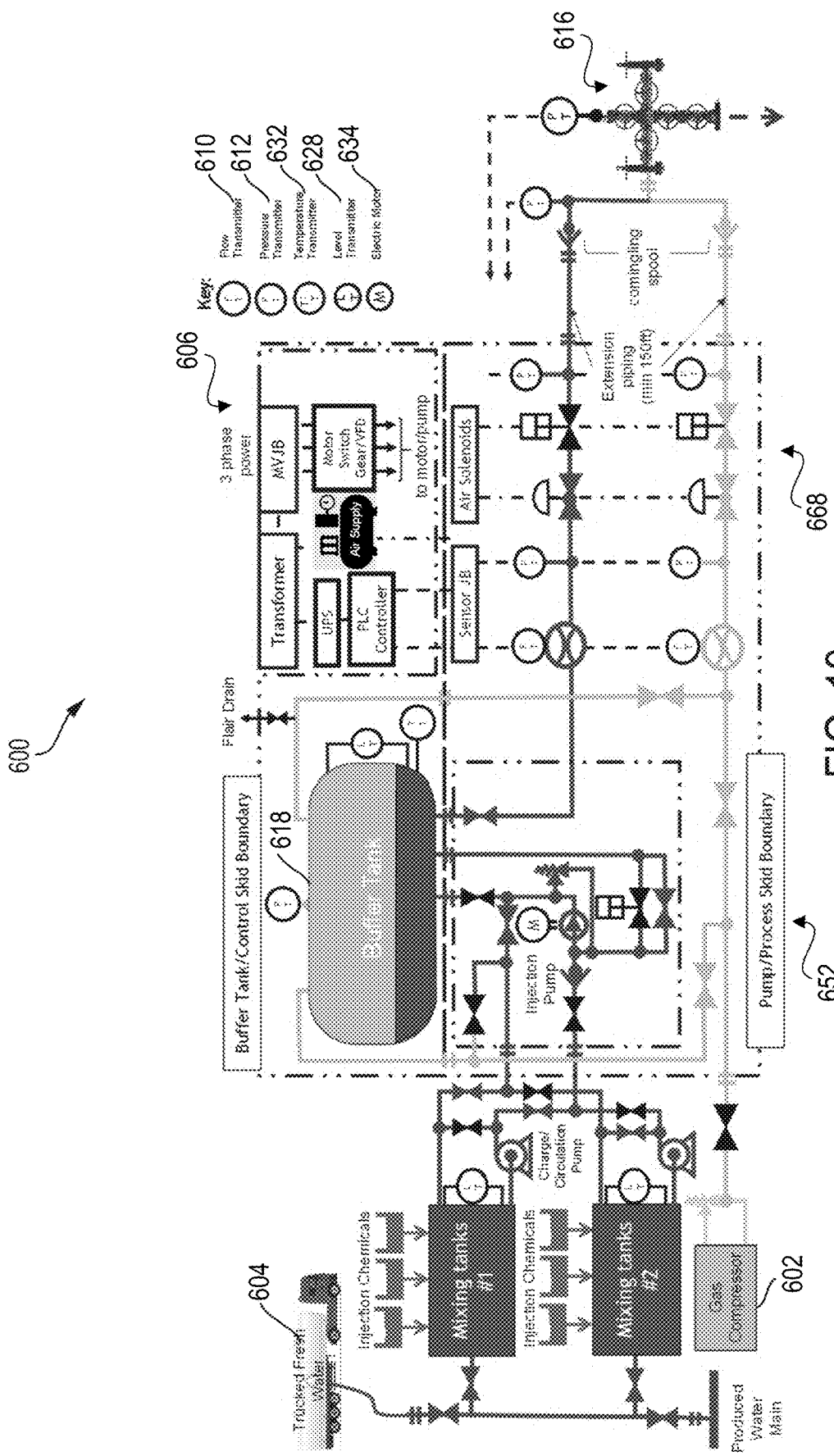

FIGS. 11-19 illustrate example sequences of the injection system 600 of FIG. 6 in accordance with aspects of the present disclosure. FIG. 11 illustrates an example pre-startup configuration of the injection system 600, which can include an empty buffer tank 618 and preparing liquid 604 and gas 602 supplies. FIG. 12 illustrates an example buffer tank fill configuration of the injection system 600, which can include filling the buffer tank 618 with liquid 604. FIG. 13 illustrates an example buffer tank circulate configuration of the injection system 600, which can include filling the buffer tank 618 to the maximum capacity of the buffer tank 618. FIG. 14 illustrates an example leak test configuration of the injection system 600, which can be utilized to determine whether a liquid leak is present in the injection system 600, as the injection system 600 is completely filled with liquid 604. FIG. 15 illustrates an example normal operation—water injection cycle configuration of the injection system 600, which can include injecting liquid 604 into the wellhead 616. FIG. 16 illustrates an example normal operation—gas injection cycle configuration of the injection system 600, which can include pressurizing the buffer tank 618 with gas 602 and injecting gas 602 into the wellhead 616. FIG. 17 illustrates an example normal operation—water injection cycle—pump in recycle configuration of the injection system 600, which can include injecting liquid 604 into the wellhead 616. FIG. 18 illustrates an example gas vent configuration of the injection system 600, which can include stopping the pump assembly 652. FIG. 19 illustrates an example buffer tank emptying configuration of the injection system 600, which can include draining the buffer tank 618.

Figure 20:
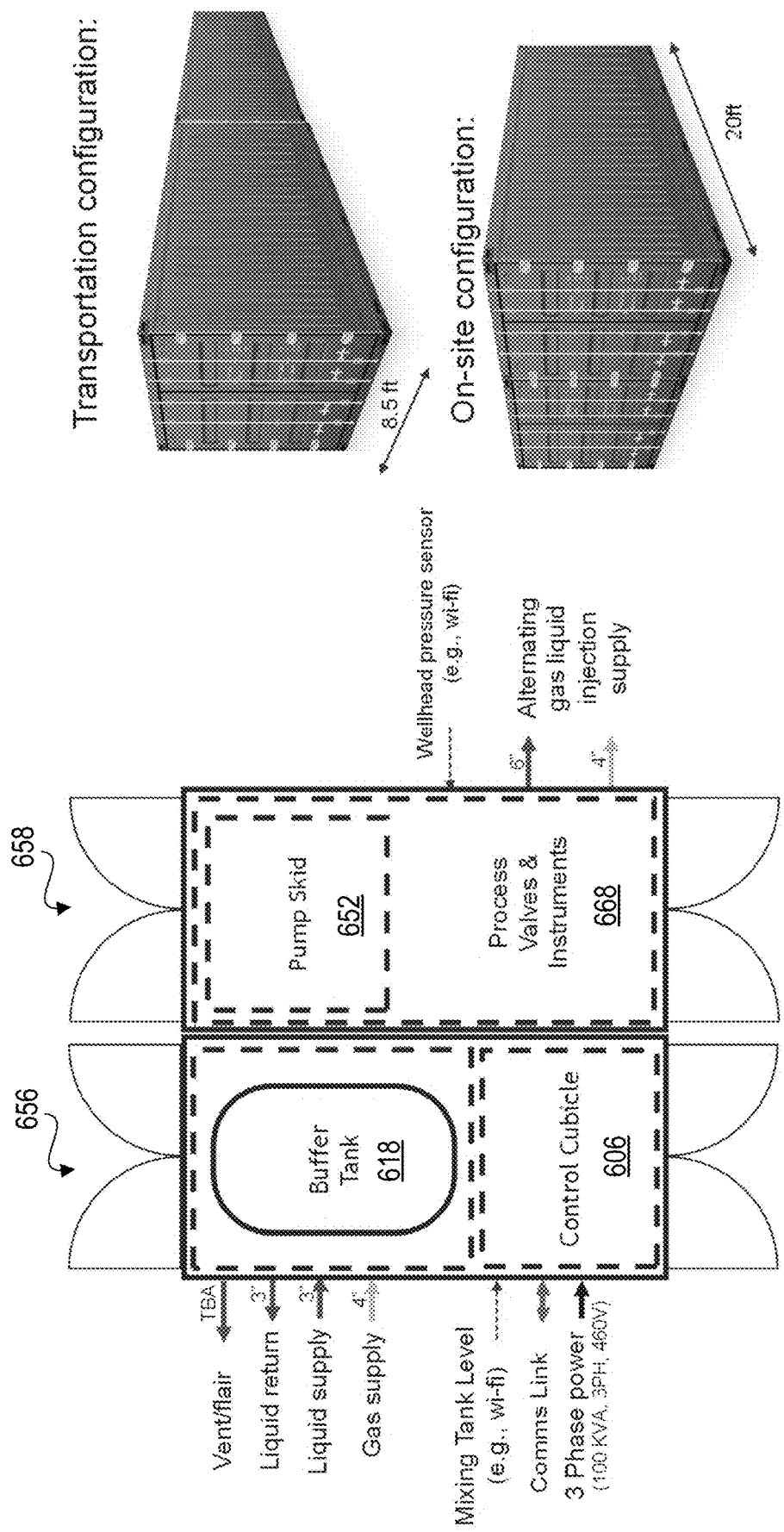
FIG. 20 illustrates example skid configurations, equipment allocations thereon and containers in which the skids can be housed in accordance with aspects of the present disclosure.

FIG. 20 illustrates example skid configurations of the injection system 600 of FIG. 6 in accordance with aspects of the present disclosure. The skid 656 can include the buffer tank 618 and the controller system 606, along with a vent/flair, a liquid return outlet (e.g., 3 inches), a liquid supply inlet (e.g., 3 inches), a gas supply inlet (e.g., 4 inches), a communications link, and a power connection (e.g., a 3-phase power with 100 KVA, 3 PH, and 460V). The skid 658 can include the pump assembly 652 and the fluid dispensing system 668, along with alternating gas 602 and liquid 604 injection supply outlets (e.g., 4 inches and 6 inches, respectively). FIG. 20 further illustrates transportation and on-site configurations of skids 656, 658.

Figure 21:
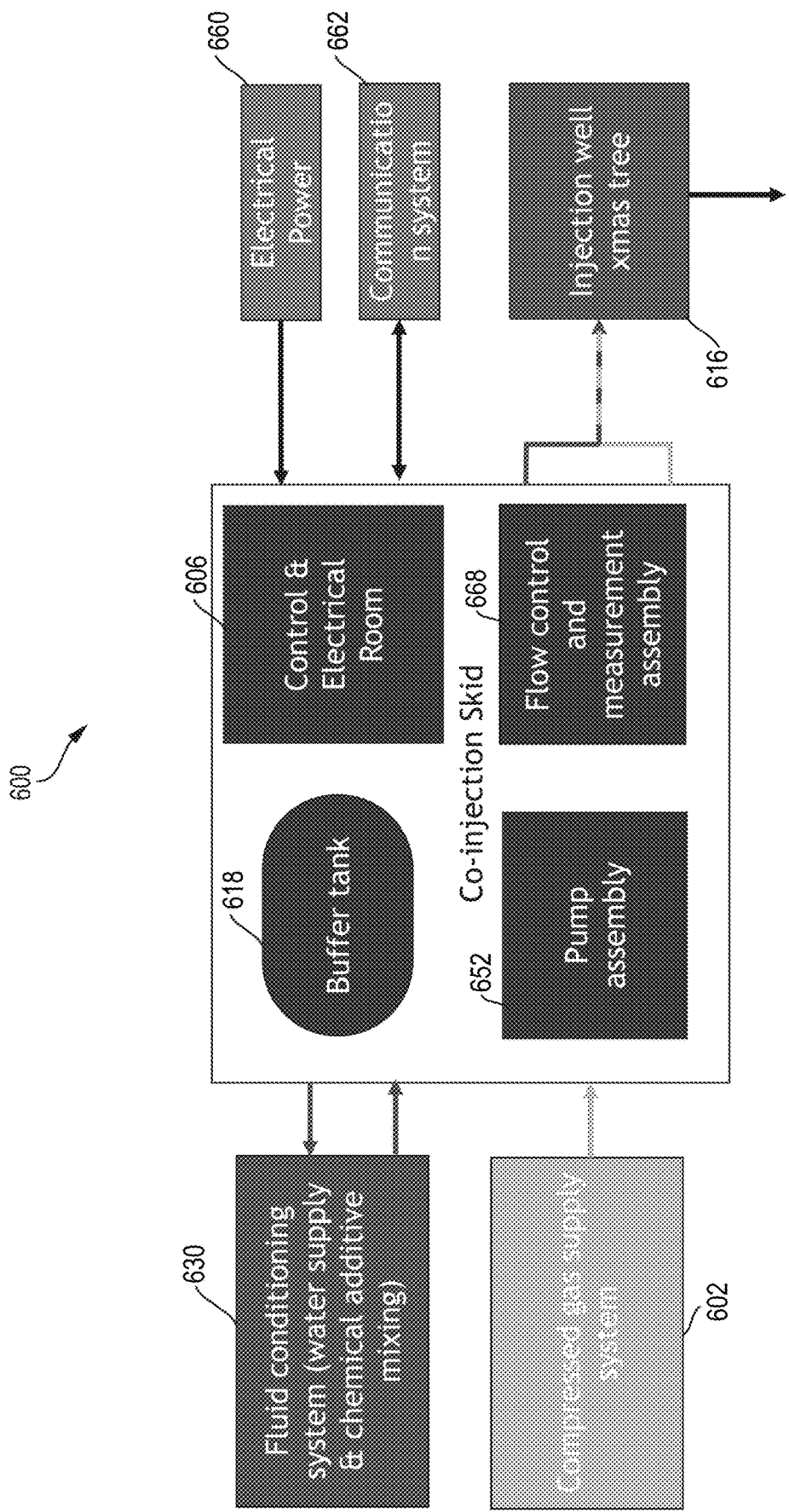
FIG. 21 illustrates an example of the injection system of FIG. 6 including electrical power components and a communication system configured in accordance with aspects of the present disclosure.

FIG. 21 illustrates an example of the injection system 600 of FIG. 6 along with electrical power and a communication system in accordance with aspects of the present disclosure. Along with the mixing tanks 630 (e.g., a fluid conditioning system that mixes liquid 604 and the chemical additives 614), the compressed gas supply system 602, the buffer tank 618, the controller system 606, the pump assembly 652, and the fluid dispensing system 668, the injection system 600 can further include external electrical power 660 and a communication system 662 (e.g., 5G, Wi-Fi, Bluetooth, Ethernet, etc.) to transmit and receive data relating to the injection system 600 (e.g., measured by flow transmitters 610, pressure transmitters 612, temperature transmitters 632, and level transmitters 628).

In some implementations, injection system 600 can include a downward slug flow generated by alternating liquid and gas injection into a pipe or annular flow path. Generating an artificial slug flow regime can delivery hydrostatic pressure to the bottom of the flow path under high gas volume fraction conditions where a natural flow pattern would exhibit separated flow. That is, for separated flow, liquid can drop through a continuous gas phase and a gas gradient would be observed at the bottom of the flow path. The generated slug flow provides for the delivery of gas and liquid to the bottom of the flow path with a lower surface injection pressure than would otherwise be possible.

Figure 26:
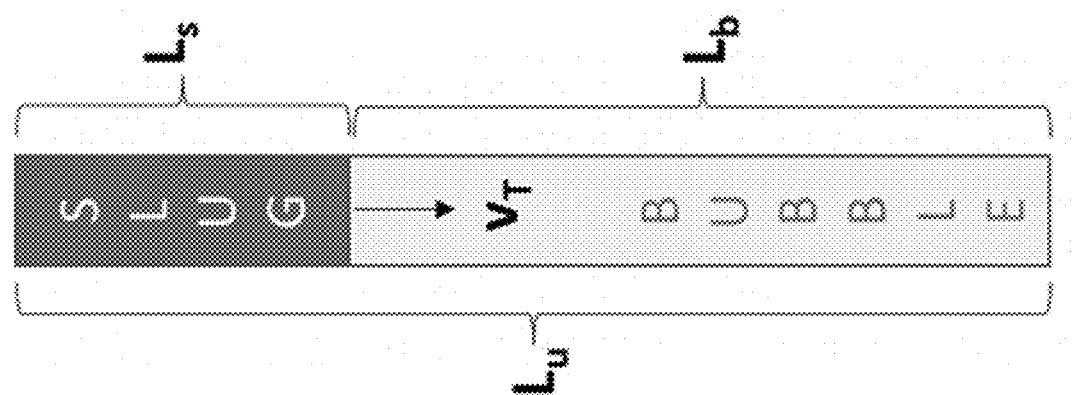
FIG. 26 illustrates an example slug unit including a liquid slug and gas slug taking the form of an entrained bubbles region in accordance with aspects of the present disclosure.

FIG. 26 illustrates an example slug unit including a liquid slug and gas bubble (also referred to as a gas slug). For downward two-phase flow, the slug has a length $L_s$ and is moving at a velocity $v_T$, while the gas bubble has a length $L_b$. The slug unit length ($L_u$) is calculated by:

$$L_u = L_s + L_b$$

The model sets the length of the generated slug length and the bubble length is calculated using a material balance with the average injection flow rates of both liquid and gas. The liquid slug can be all liquid or can contain entrained gas providing a liquid holdup (e.g., volume fraction) in the slug, $H_s$ and a liquid holdup in the gas bubble, $H_b$.

For upward flow in a pipe, a minimum stable slug length between 32-64 d has been observed, where d is the effective diameter of the flow path. For downward flow, the generated slug length can adjusted as needed to deliver the EOR process to the reservoir and may be greater than the minimum slug length ($L_s$) in the vertical flow path:

$$L_s > 64d$$

The selection of the slug length sets several important parameters for the slug generation process. This includes the length of time for liquid flow and the magnitude of pressure increase at the inlet of the downward flow path. The length of time for passage for the liquid slug ($t_s$) is provided by:

$$t_s = \frac{L_s}{v_T}$$

Where $v_T$ is the translational velocity of the liquid slug. Considering only the hydrostatic pressure losses associated with adding a liquid slug to the downward vertical flow stream, the following is provided:

$$\Delta P_s = \gamma_L L_s$$

Where $\gamma_L$ is the pressure gradient of the injected liquid phase and when the liquid slug contains no embedded gas. If there is a gas present in the liquid slug, then:

$$\Delta P_s = \gamma_L L_s H_s$$

Given a set slug length (Ls), the bubble length ($L_b$) is calculated using a material balance with the average gas and liquid injection rates:

$$L_b = L_s \left( \frac{v_{SG}}{v_T - v_{SG}} \right) = L_s \left( \frac{v_{SG}}{v_{SL}} \right)$$

The length of time for passage for the gas bubble ($t_b$) is provided by:

$$t_b = \frac{L_b}{v_T}$$

Where $v_T$ is the translational velocity of the liquid slug.

For upward and vertical slug flow, the liquid slug travels at a translational velocity ($v_T$) higher than the mixture flow velocity ($v_m$) as the nose of the slug is located near the center line of the pipe where the fluid is traveling approximately 1.2 times the average velocity. Also, the drift velocity of a Taylor bubble, $v_{TB}$, in a static liquid is superimposed on the mixture velocity. For low viscosity fluids:

$$v_T = 1.2 v_m + v_{TB}$$

where, $$v_m = v_{SL} + v_{SG}$$

$$v_{SL} = \frac{Q_L}{A_P}$$

$$v_{SG} = \frac{Q_G}{A_P}$$

For annular flow paths the annular flow area can be represented as:

$$A_p = A_{eq} = \frac{\pi}{4} \left[ ID_c^2 - OD_t^2 \right]$$

Where $ID_c$ is the casing internal diameter and $OD_t$ is the tubing external diameter. An equivalent or effective diameter of the annular flow path, $d_e$, can be calculated by:

$$d_e = \sqrt{ID_c^2 - OD_t^2}$$

and the hydraulic diameter, $d_h$, by $$d_h = \frac{ID_c^2 - OD_t^2}{ID_c - OD_t}.$$

Provided below is a table showing values for flow area, equivalent velocity, and hydraulic diameter for injection flow paths in unconventional Huff & Puff applications.

| Wellbore Flow | 7-inch 32# | 5½-inch 23# | 7 × 2⅜ | 7 × 2⅞ | 5½ × 2⅜ | 5½ × 2⅞ | 3.5-inch 9.3# | 2.875-inch 6.5# | 2.375-inch 4.7# |
|---|---|---|---|---|---|---|---|---|---|
| Hydraulic (in) | 6.094 | 4.67 | 3.719 | 3.219 | 2.295 | 1.795 | 2.992 | 2.441 | 1.995 |
| Eqivalent ID (in) | 6.094 | 4.67 | 5.612 | 5.373 | 4.021 | 3.680 | 2.992 | 2.441 | 1.995 |
| Flow Area (ft2) | 0.2026 | 0.1189 | 0.1718 | 0.1575 | 0.0882 | 0.0739 | 0.0488 | 0.0325 | 0.0217 |

For downward slug flow, there is no Taylor bubble rise velocity to superimpose. As such, the slug translational velocity is the mixture velocity:

$$v_T = v_m$$

The downward flow is assumed to be fully turbulent. That is when the Reynolds number, Re, is greater than 10,000, where Re is defined below:

$$Re = \frac{\rho_m v_m d}{\mu_m}$$

In addition, the effective downward velocity may be sufficient to overcome buoyance forces that can cause the gas to move upward, rather than downward, in the pipe or annular space. The highest upward velocity in a pipe is found in large Taylor bubble rather than small bubbles. As such, the downward mixture velocity must be greater than the upward, buoyance-driven, Taylor bubble velocity. The velocity of the Taylor bubble is provided by:

$$v_{TB} = 0.35\sqrt{gd}$$

As injected fluids is a low viscosity Newtonian fluid (e.g., water or brine), this equation describes the Taylor velocity in the slug generating process.

For generated slug flow, the gas density is expected to be significant when compared with liquid and this can be accounted for using the following equation:

$$v_{TB} = 0.35\sqrt{gd\left(\frac{\Delta\rho}{\rho_L}\right)}$$

Therefore, for delivery of this process:

$$v_m > v_{TB}$$

Pressure increases in downward flow of a mixed-phase gas-liquid stream is dominated by the gravitation pressure gradient and the frictional pressure gradient, which is less except at high velocities. Flow created slug flow gravitation and frictional pressure increases can be calculated by:

$$(\Delta P_{grav})_s = \rho_L g L_s$$

The frictional pressure drop is provided by:

$$(\Delta P_{fric})_s = 2\left(\frac{f_L \rho_L v_s^2}{d}\right) L_s$$

The gravitation pressure increase in the gas bubble regions is provided by:

$$(\Delta P_{grav})_b = \rho_G g L_b$$

The frictional pressure losses in the gas bubble are small and difficult to determine. As such, these are neglected.

Figure 27:
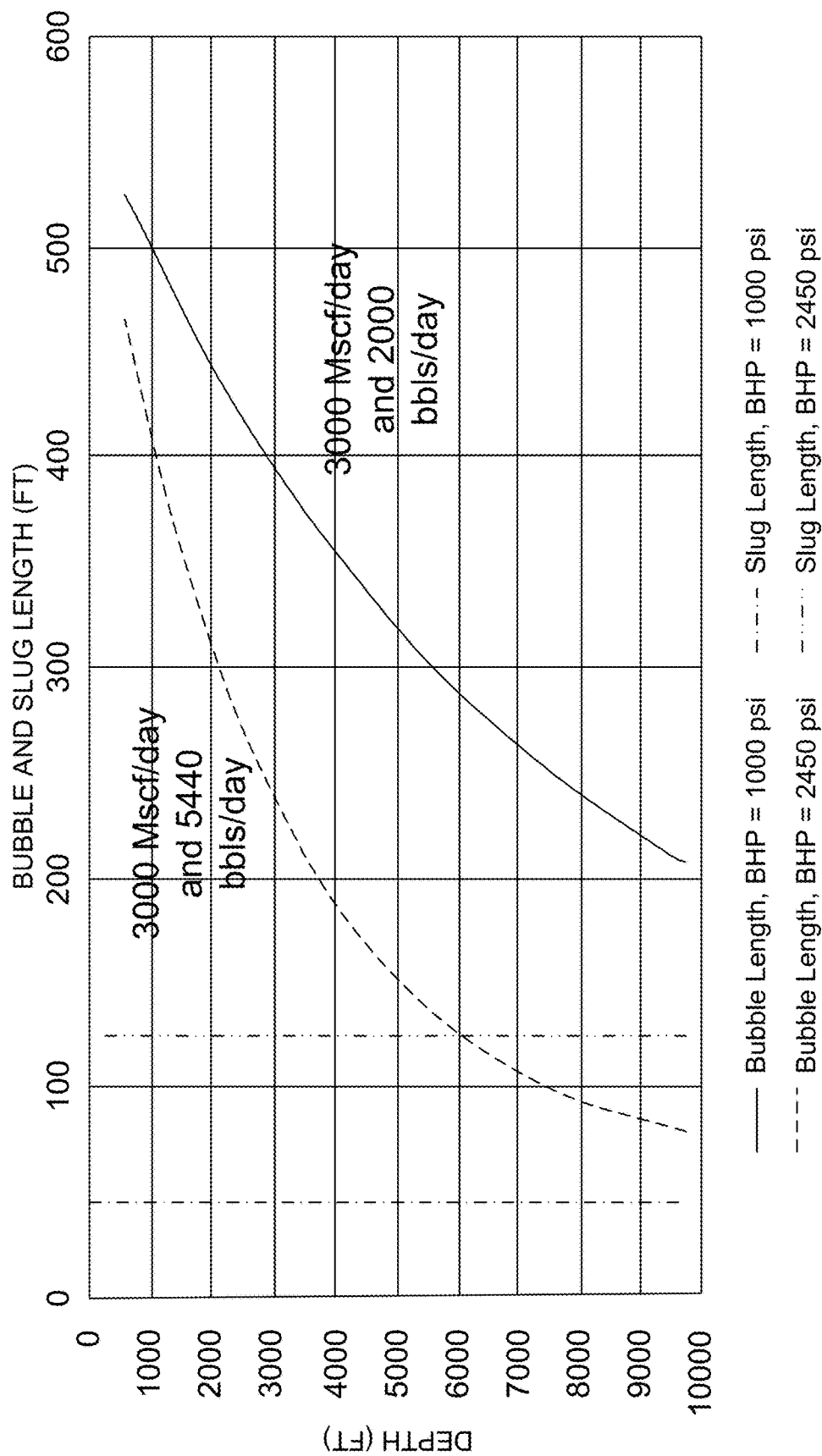
FIG. 27 illustrates an example gas bubble slug and liquid slug length chart in accordance with aspects of the present disclosure.

Multiple slug units will be distributed in the vertical flow path to create the pressure needed at the bottom before entry into the reservoir. As slug units move downward, pressure increases and the gas in the gas bubble region is compressed. This results in both increased density of the gas, but also a dramatic decrease in the length of the bubble region. Given below are example profiles of slugs in a vertical downward pipe. For example, as shown in FIG. 27 to reach a $P_{bh}=1000$ psi, an average liquid rate of 2000 bbls/day is needed and $L_s=\sim46$ ft. To reach a $P_{bh}=2450$ psi, an average liquid rate of 5450 bbls/day is needed and slug length has increased to $L_s\sim125$ ft. As these two examples have different pressure "end points," the bubble lengths decrease from initial lengths over 500 ft to 210 and 80 ft, depending on the pressure. In both examples, the surface injection pressure was 300 psig.

Figure 28:
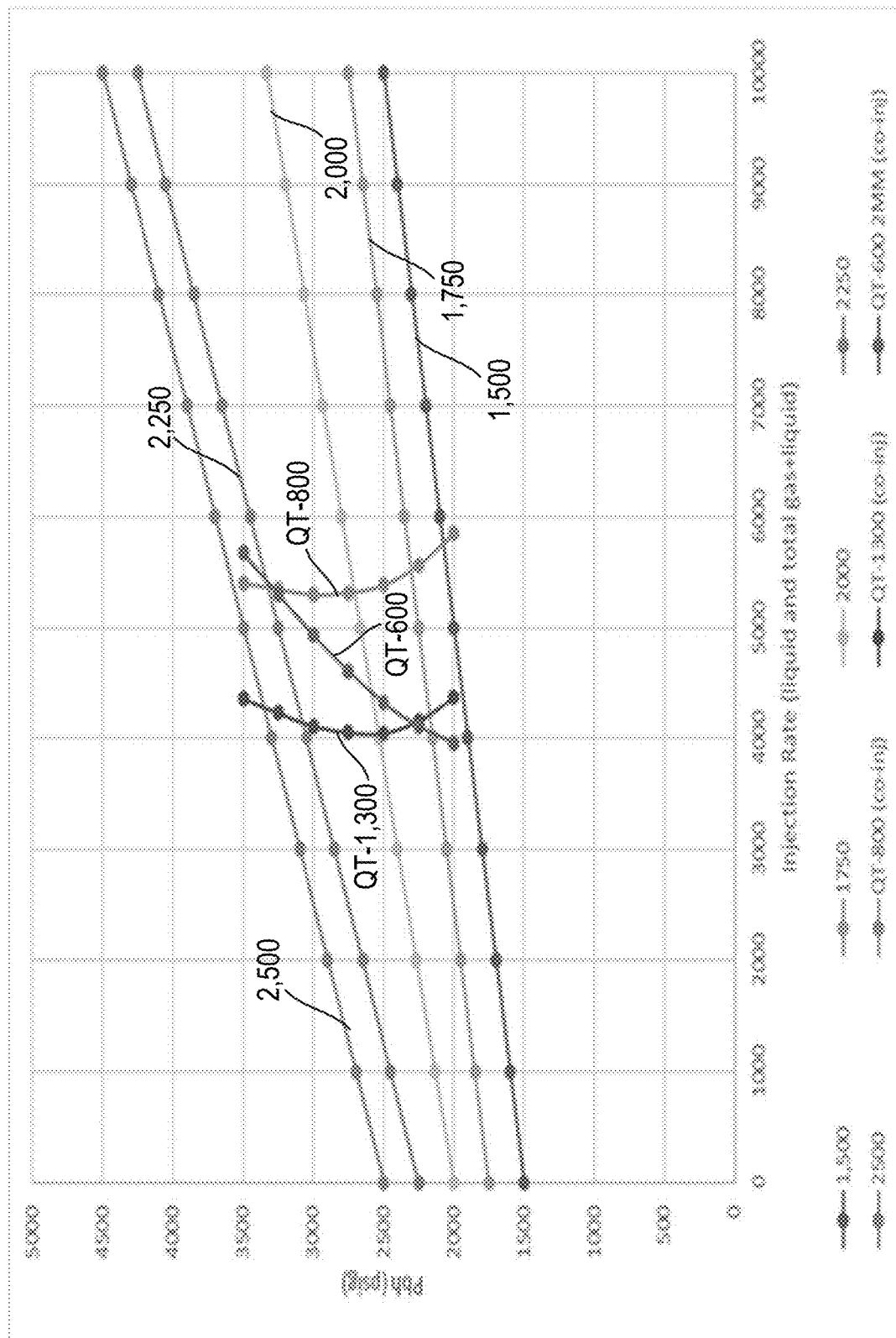
FIG. 28 illustrates an example of an injection system analysis plot in accordance with aspects of the present disclosure.

Systems analysis is a method that can be used to estimate the bottomhole injection rates and pressure for the EOR injection process described herein. Systems analysis consists of plotting the reservoir Inflow Performance Relationship (IPR) curve/line and the Tubing Curve. The intersection of these two curves defines the operation point of the reservoir-tubing system. The injection process uses an analysis of the production performance of the well to determine the IPR. Various other methods can be used to draw the IPR curve, but for illustration purpose a straight-line IPR curve has be utilized which is termed the Productivity Index (PI) and has units of BBL/psi. Different PI's can be used to estimate both the transient early life production and later life stabilized production. The production data provide an estimate of the flow possible through the fracture/reservoir system of the well. To model injection, rather that production, this same PI can be utilized but with the higher pressure being in the wellbore and lower pressure in the reservoir. The example shown in FIG. 28 uses an early life with a PI of 10 BBL/psi declining to 5 BBL/psi. Five different lines are shown to represent Pbh of 1,500 at the start of the injection cycle, 1,750, 2,000 for early in the injection cycle when the fracture-reservoir system is still being charged and 2,250, and 2,500 psig where there is more interaction with the rock matrix. In this example, the target MMP is 2,500 psig. The "bottomhole" fluid rates combine all of the injected fluids (e.g., water and gas), i.e., the gas volume in reduced to Pbh and Tbh. For injection, the 10 BBL/psi injectivity can also be assumed for the fracture-reservoir system and this is utilized in the lower 3 reservoir lines. Later the 5 BBL/psi value it used as the reservoir is more fully repressurized. FIG. 28 illustrates Tubing Curves for three different injection cases:

1) QT-800 (co-inj): for the example with 800 psig gas source pressure at the surface. In this example, the injection gas rate was 3 MMscf/day.

2) QT-1300 (co-inj): for the example with 1,300 psig gas source pressure at the surface. In this example, the injection gas rate was 3 MMscf/day.

3) QT-600 (co-inj): for the case with 600 psig gas source pressure at the surface. In this example, the injection gas rate was 2 MMscf/day.

In all of these examples, the liquid rate varied as required to deliver the Pbh at various points in the injection cycle. As shown in FIG. 28, total fluid injection rate at bottomhole condition were in the 4,000-6,000 BPD range for the entire injection cycle, while bottomhole pressures increased over the cycle.

The injection process of the present technology can generate a reservoir pressure greater than the Minimum Miscibility Pressure (MMP) of the reservoir oil and the injection gas. This is important for single-well alternating stacked gas/liquid slug application in order for the injected gas to have a significant EOR benefit. For conventional reservoirs, this is also desirable and reservoir pressure can be calculated with the methods as described herein. The processes as described herein can generate a pressure in the created/natural fracture system and the rock surface that is over MMP, while realizing that reaching MMP in the ultra-tight rock may not be practical in terms of time.

Figure 29:
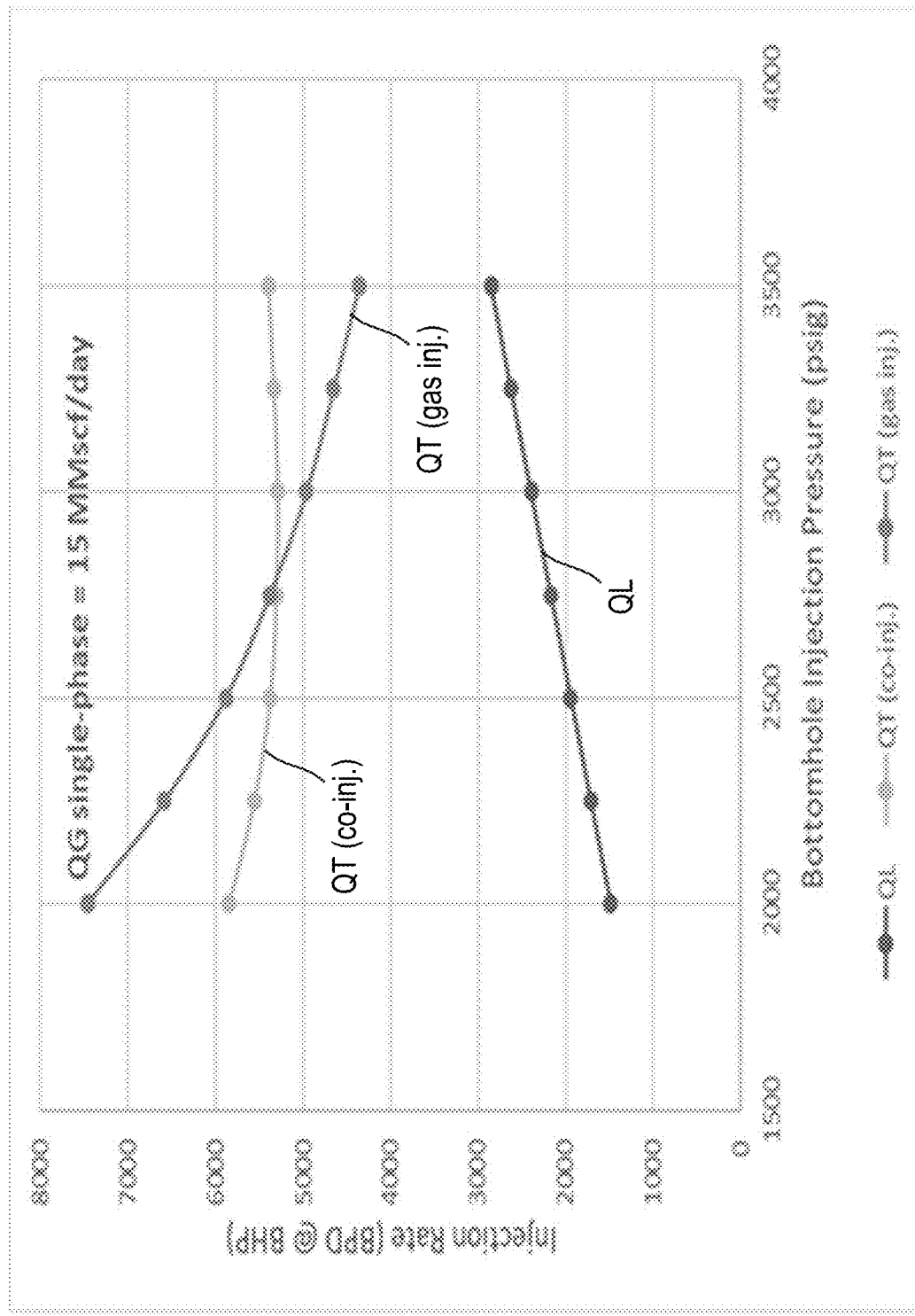
FIG. 29 illustrates an example chart demonstrating fluid injection rates (liquid phase, gas phase and mixed and/or alternating phase) in accordance with aspects of the present disclosure.

Referring to FIG. 28, the bottomhole injection pressure generated by the injection process is greater than the reservoir pressure. For example, the injection cycle is begun with a reservoir pressure of 1,500 psig. To initiate injection using 800 psig, the required bottomhole pressure is approximately 2,050 psig. To generate this Pbh, a combined gas and liquid rate, a Pbh conditions, is approximately 5,700 BPD. As injection continues over the injection cycle, the reservoir pressure increases, and likewise, the Pbh required to achieve injection increases. At the end of the injection cycle, when reservoir pressure is about 2,500 psig, Pbh is above 3,500 psig. The injection process, as described herein, delivered by the surface module can continually adjust the liquid rates to achieve the required Pbh. As shown in FIG. 29, the average liquid rates start at 1,500 BWPD and moves to nearly 3,000 BWPD at the end of the cycle. In some examples, it is not only necessary to increase the liquid rates, but the gas rate may be decreased. This dynamic process is achieved by analyzing the well primary production rate-time-pressure data, converting this to an injection process, and calculating the tubing curves generated by the injection process. Feedback from the injection rates and pressure can be utilized to confirm the dynamic modeling of the process and make adjustments continually over the injection cycle.

Figure 30:
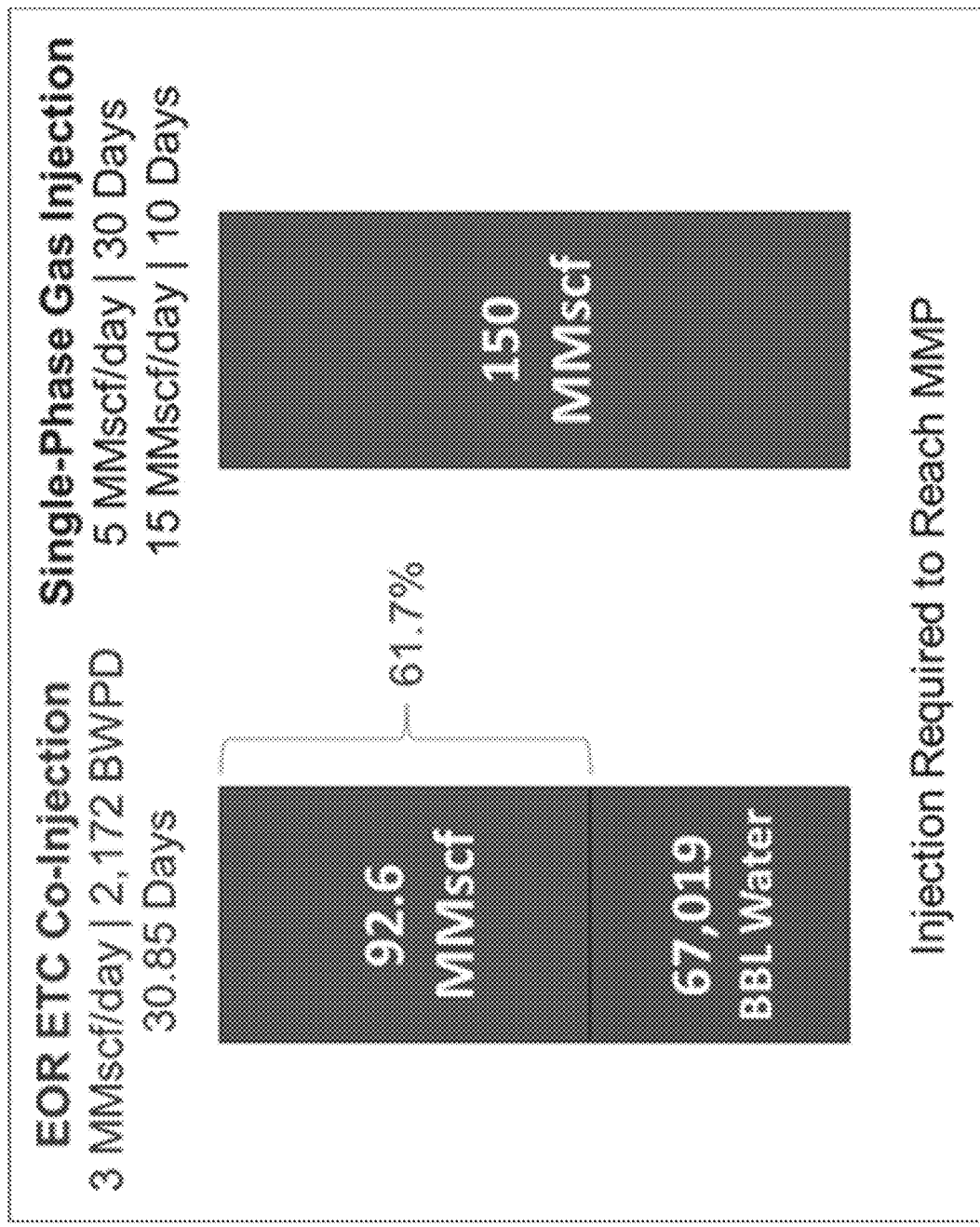
FIG. 30 illustrates examples of end-to-end volumes in a reservoir in accordance with aspects of the present disclosure.

The volumes injected with the injection process can be compared with those injected during a continuous single-phase gas EOR process. Using the single-phase gas injection process as a reference, the same reservoir pressure can be reached by injecting the same reservoir volumes, whether gas or liquid, as long as the gas volumes are converted to reservoir conditions. FIG. 30 illustrates an example where the same reservoir volume has been injected by the injection process and the single-phase gas injection process. As can be seen, the injection process delivered approximately 61.7% of the gas of the single-phase process with the remainder of the reservoir volume occupied by 67,019 BW. FIG. 30 also illustrates the injection rates and anticipated times to reach the same MMP pressure, assuming equivalent leakage. However, leakage out of the drainage area can be expected to be less for the injection process due to the lower mobility of the water-gas mixture.

For conventional water-wet reservoirs, injected water can imbibe into the reservoir rock, thereby producing additional oil through spontaneous imbibition. For oil wet rock, which has been common for unconventional reservoirs in the United States like the Bakken, Eagle Ford and Wolfcamp, surfactant added to the water stream can alter the wettability of the rock, also allowing spontaneous imbibition to occur.

Gas injection in the reservoir is highly mobile and can quickly move out of the drainage area. This is due to the low viscosity of gas and the higher permeability of gas in the fracturing generated by a near-wellbore fracture system, natural fracture system, and conventional reservoir rock. For the injection process, water reduces the mobility of the injected gas, thereby slowing its movement in the reservoir and improving the ability of the gas to stay in the well drainage area. This delivers EOR benefits from miscibility with the oil and a multi-contact miscibility process.

The injected liquid also provides a benefit in terms of time to be repressurized. As water is an incompressible fluid, water can increase reservoir pressure and replace reservoir "voidage" better than compression gas where volume is depended on the pressure and needs to be continually pressurized to fill a given volume.

The injected liquid also provides a cost savings benefit. By utilizing produced water, the injection system utilizes a waste stream that would have incurred a disposal cost. In most cases, when natural gas volumes are replaced by water volumes, the process is more cost effective as natural gas can be sold for beneficial uses and is more expensive than produced water or even a blend of fresh water and produced water.

Figure 31:
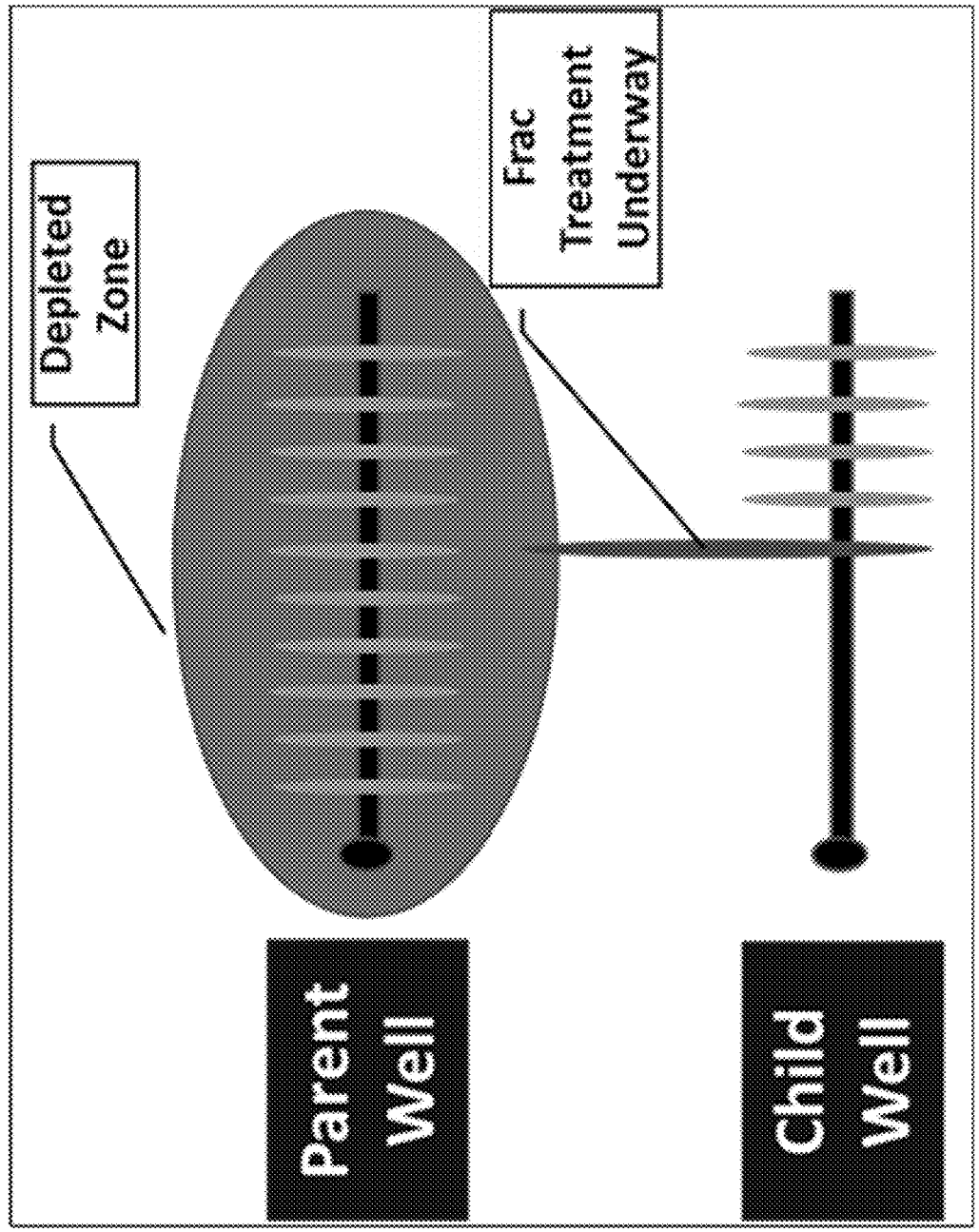
FIG. 31 illustrates an example parent and child well interaction in accordance with aspects of the present disclosure.

FIG. 31 illustrates an example parent and child well interaction in accordance with aspects of the present disclosure. Interference between older and newer wells is an issue that reduces well performance and recovery in unconventional developments. Hydraulic fracturing processes (frac) are used for stimulating unconventional wells by injecting high pressure water and sand into a wellbore, completion is then carefully setup to create a long vertical fracture. The fractures are created, one-by-one, down the length of the horizontal wellbore from the toe to the heal. The growth and direction of each of these fractures is largely dictated by the stress field in the reservoir. The depleted areas of the reservoir also have a direct influence on the in situ stress field. Often wells are not all drilled at the same time in unconventional developments to allow for early assessment of the reservoir and well completions.

The first-drilled and completed well is referred to as the "Parent Well," and subsequent drilled and completed wells are referred to as "Child Wells." Typically, the Parent Well has been produced resulting in a lower-pressure drainage area around the horizontal well/fracture system. FIG. 31 illustrates an example Parent Well with multiple fractures extending from the horizontal wellbore and a shaded low-pressure drainage area created by production of the well. For FIG. 31, the viewpoint is from a downward perspective and the vertical wellbore is represented simply by a circle. When a Child Well is drilled near the Parent Well, the fracturing process can be influenced by the nearby Parent Well.

As shown in FIG. 31, the first four fractures in the Parent Well were successful and stayed in the reservoir area targeted by the Parent Well. However, the sixth Frac (showed darker) followed the path of least resistance and grew into the Parent Well. This creates problems for both wells including a loss of production and recoverable reserves. Furthermore, the Parent Well is now exposed to high-pressure water and sand. This can damage the Parent Well and may even exceed the wellhead pressure, which can create a loss of containment issue at the surface. Large amounts of water entering the Parent Well can effectively "kill" the Parent Well and production may not be able to be restored thereafter.

For the Child Well, the fracture does not effectively cover the intended reservoir drainage area and is skewed to the reservoir around the Parent Well. This results in lower production and recovery. To protect the Parent Well, this well is often shut in and water is pumped into the well to increase pressure in the reservoir that has been depleted by production. This type of "Protect-the-Parent" operation is often effective in allowing successful completion of the Child Well, but the Parent Well may not recover and be damaged. The injection system 600 can be utilized in a Protect-the-Parent process to protect targeted wells.

As an alternative to pumping water into the Parent Well, an injection process 600, as described herein, can be utilized to achieve better results. Pumping high pressure water during the fracturing treatment of the Child Well loads the near-wellbore fracture system, and oil and gas production is often difficult to restore. The injection process 600 injects both gas and liquid by utilizing injection system 600. The expandability of the injected gas is a factor to well unloading when the well is placed back into production, thereby providing energy to remove water from the near-wellbore fracture system and the wellbore.

Injection can include "energized" fluid, which greatly improves the probability of restoring production from the well flowing the fracturing treatments in the Child Well. As described herein, the injection process 600 can be delivered into a Parent Well in a multi-day process to reach a target pressure to prevent interference with the fracturing of the Child Well. Surfactants can also be added to the injected liquid to boost production and improve recovery in the Parent Well, while performing the Protect-the-Parent operation. Alternatively, the pressure in the depleted Parent Well can be brought above the MMP, and Miscible EOR recover can be delivered to the Parent Well during the Protect-the-Parent operation.

Figure 32:
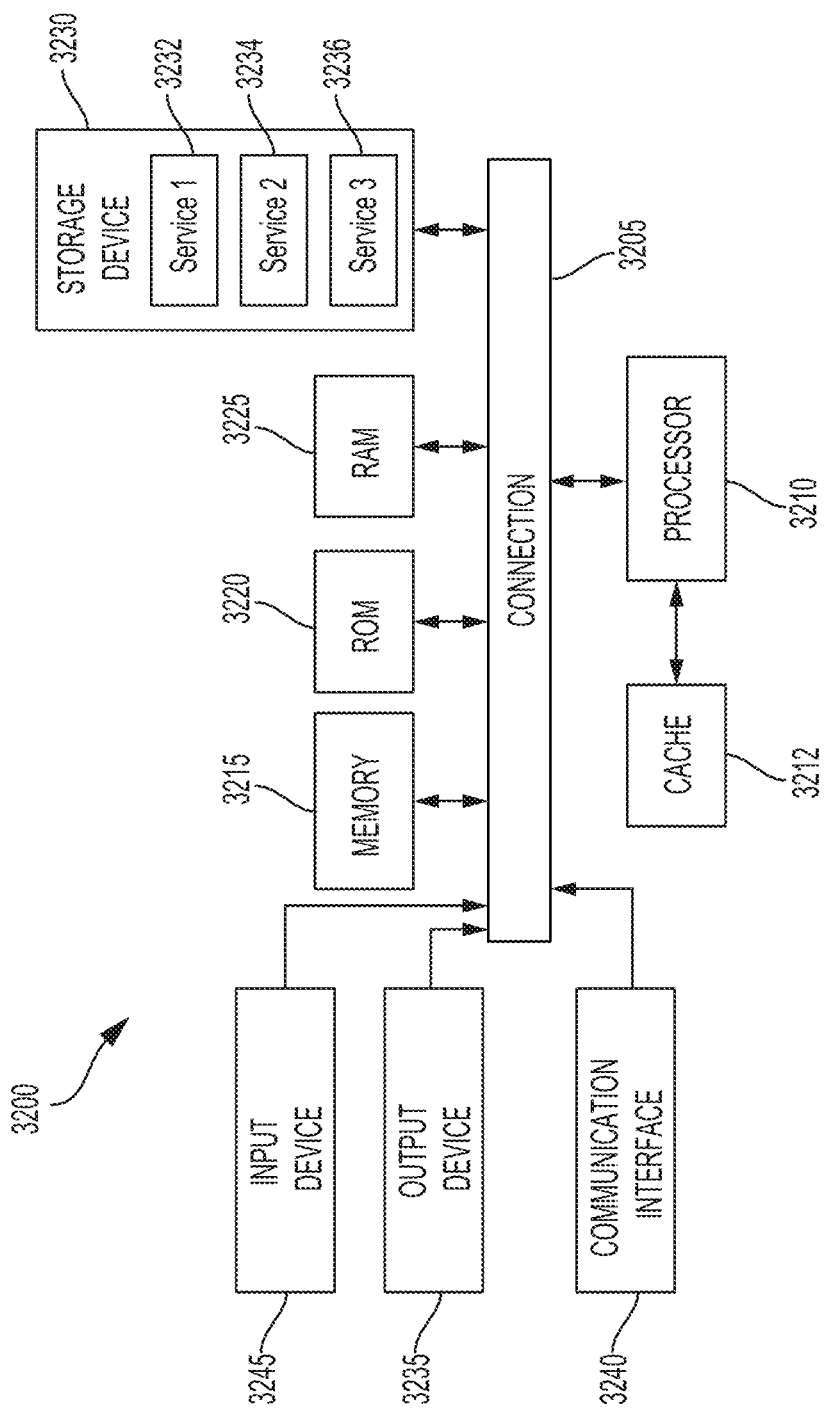
FIG. 32 illustrates an example processor-based system with which some aspects of the subject technology can be implemented.

Use of the injection process 600 also provides operations at a low cost while also lowering risk of conducting an EOR pilot in a particular field, area of a field, or zone. FIG. 32 illustrates an example computing device architecture 3200 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 32 illustrates an example computing device architecture 3200 of a computing device which can implement the various technologies and techniques described herein. The components of the computing device architecture 3200 are shown in electrical communication with each other using a connection 3205, such as a bus. The example computing device architecture 3200 includes a processing unit (CPU or processor) 3210 and a computing device connection 3205 that couples various computing device components including the computing device memory 3215, such as read only memory (ROM) 3220 and random access memory (RAM) 3225, to the processor 3210.

The computing device architecture 3200 can include a cache of high-speed memory connected directly with, in close proximity to, or integrated as part of the processor 3210. The computing device architecture 3200 can copy data from the memory 3215 and/or the storage device 3230 to the cache 3212 for quick access by the processor 3210. In this way, the cache can provide a performance boost that avoids processor 3210 delays while waiting for data. These and other modules can control or be configured to control the processor 3210 to perform various actions. Other computing device memory 3215 may be available for use as well. The memory 3215 can include multiple different types of memory with different performance characteristics. The processor 3210 can include any general purpose processor and a hardware or software service, such as service 1 3232, service 2 3234, and service 3 3236 stored in storage device 3230, configured to control the processor 3210 as well as a special-purpose processor where software instructions are incorporated into the processor design. The processor 3210 may be a self-contained system, containing multiple cores or processors, a bus, memory controller, cache, etc. A multi-core processor may be symmetric or asymmetric.

To enable user interaction with the computing device architecture 3200, an input device 3245 can represent any number of input mechanisms, such as a microphone for speech, a touch-sensitive screen for gesture or graal input, keyboard, mouse, motion input, speech and so forth. An output device 3235 can also be one or more of a number of output mechanisms known to those of skill in the art, such as a display, projector, television, speaker device, etc. In some instances, multimodal computing devices can enable a user to provide multiple types of input to communicate with the computing device architecture 3200. The communications interface 3240 can generally govern and manage the user input and computing device output. There is no restriction on operating on any particular hardware arrangement and therefore the basic features here may easily be substituted for improved hardware or firmware arrangements as they are developed.

Storage device 3230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 3225, read only memory (ROM) 3220, and hybrids thereof. The storage device 3230 can include services 3232, 3234, 3236 for controlling the processor 3210. Other hardware or software modules are contemplated. The storage device 3230 can be connected to the computing device connection 3205. In one aspect, a hardware module that performs a particular function can include the software component stored in a computer-readable medium in connection with the necessary hardware components, such as the processor 3210, connection 3205, output device 3235, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

In a related aspect, if one item is recited in the claim, that limitation covers one or more of that item as for instance, two of a certain item comprises one of those items, unless expressly claimed as being a single item or otherwise limited to one item, and no more.

Statements of the disclosure include:

Statement 1: A system for conducting enhanced oil recovery by establishing a plurality of stacked, alternating slugs of gas and liquid travelling downhole into a subterranean well, the system comprising: a buffer tank including: a liquid inlet through which liquid is received from a liquids source into the buffer tank; a gas inlet through which gas is received from a pressured gas source into the buffer tank; a gas outlet in fluid communication with gas reservoired in the buffer tank; and a liquid outlet in fluid communication with liquid reservoired in the buffer tank; a pressure control configured to maintain a specified pressure in gas reservoired within the buffer tank, and wherein the pressured gas reservoired within the buffer tank exerts a corresponding pressure on liquid reservoired within the buffer tank; and a fluid dispensing system in fluid communication with the gas and liquid outlets of the buffer tank, the fluid dispensing system being controlled to deliver alternating slugs of gas and liquid to a subterranean wellhead and thereby establishing a plurality of stacked, alternating slugs of gas and liquid travelling downhole into a subterranean well.

Statement 2: A system according to Statement 1, wherein the liquid inlet receives predominantly liquid-phase fluid from a mixing tank, constituting a liquid source, into the buffer tank.

Statement 3: A system according to any of Statements 1 and 2, wherein the gas inlet receives predominantly gas-phase fluid from a gas compressor, constituting a pressured gas source, into the buffer tank.

Statement 4: A system according to any of Statements 1 through 3, wherein the fluid dispensing system further comprises a pressured gas open/closed valve through which pressured gas from the buffer tank flows to the subterranean wellhead, the gas open/closed valve controlled to: open and initiate gas flow from the pressured buffer tank to the subterranean wellhead; and close and cease gas flow from the pressured buffer tank to the subterranean wellhead.

Statement 5: A system according to any of Statements 1 through 4, wherein the fluid dispensing system further comprises a pressured liquid open/closed valve through which pressured liquid from the buffer tank flows to the subterranean wellhead, the liquid open/closed valve controlled to: open and initiate liquid flow from the pressured buffer tank to the subterranean wellhead; and close and cease liquid flow from the pressured buffer tank to the subterranean wellhead.

Statement 6: A system according to any of Statements 1 through 5, wherein the fluid dispensing system further comprises a pressured gas open/closed valve through which pressured gas from the buffer tank flows to the subterranean wellhead, the gas open/closed valve controlled to: open and initiate gas flow from the pressured buffer tank to the subterranean wellhead; and close and cease gas flow from the pressured buffer tank to the subterranean wellhead.

Statement 7: A system according to any of Statements 1 through 6, wherein the fluid dispensing system is controlled to transition from delivering a slug of gas from the pressured buffer tank to a slug of liquid from the buffer tank by coordinated closure of the gas open/closed valve and opening of the liquid open/closed valve.

Statement 8: A system according to any of Statements 1 through 7, wherein the gas pressure of the gas slug at the gas open/closed valve immediately before transition from delivering a gas slug to delivering a liquid slug is substantially equal to the liquid pressure of the liquid slug at the liquid open/closed valve immediately after the transition in dependence on the gas pressure being applied on the liquid reservoired in the buffer tank.

Statement 9: A system according to any of Statements 1 through 8, wherein gas pressure is applied directly upon the liquid reservoired in the buffer tank by open contact of the gas on the liquid.

Statement 10: A system according to any of Statements 1 through 9, wherein the fluid dispensing system is controlled to transition from delivering a slug of liquid from the pressured buffer tank to a slug of gas from the buffer tank by coordinated closure of the liquid open/closed valve and opening of the gas open/closed valve.

Statement 11: A system according to any of Statements 1 through 10, wherein the liquid pressure of the liquid slug at the liquid open/closed valve immediately before transition from delivering a liquid slug to delivering a gas slug is substantially equal to the gas pressure of the gas slug at the gas open/closed valve immediately after the transition in dependence on the gas pressure being applied upon the liquid reservoired in the buffer tank.

Statement 12: A system according to any of Statements 1 through 11, wherein the gas pressure is applied directly upon the liquid reservoired in the buffer tank by open contact of the gas on the liquid.

Statement 13: A system according to any of Statements 1 through 12, wherein each of the gas open/closed valve and the liquid open/closed valve is remotely actuable.

Statement 14: A system according to any of Statements 1 through 13, wherein control of the gas open/closed valve and the liquid open/closed valve to transition between delivery of gas slugs and liquid slugs is automated.

Statement 15: A system according to any of Statements 1 through 14, wherein alternation between the delivery of gas slugs and liquid slugs to establish a stacked column of alternating slugs in a subterranean well is controlled so that a weight of the liquid slugs contributes a downward force on the stacked column at a formation to be stimulated.

Statement 16: A system according to any of Statements 1 through 15, wherein the transition from delivering a slug of liquid from the pressured buffer tank to a slug of gas from the buffer tank by coordinated closure of the liquid open/closed valve and opening of the gas open/closed valve occurs in about one second.

Statement 17: A system according to any of Statements 1 through 16, wherein the transition from delivering a slug of liquid from the pressured buffer tank to a slug of gas from the buffer tank by coordinated closure of the liquid open/closed valve and opening of the gas open/closed valve occurs in less than one second.

Statement 18: A system according to any of Statements 1 through 17, wherein a transition from delivering a slug of gas from the pressured buffer tank to a slug of liquid from the buffer tank by coordinated closure of the gas open/closed valve and opening of the liquid open/closed valve occurs in about one second.

Statement 19: A system according to any of Statements 1 through 18, wherein the transition from delivering a slug of gas from the pressured buffer tank to a slug of liquid from the buffer tank by coordinated closure of the gas open/closed valve and opening of the liquid open/closed valve occurs in less than one second.

Statement 20: A system according to any of Statements 1 through 19, wherein the fluid dispensing system is controlled to deliver pressured gas from the buffer tank for between about 15 and 100 seconds, thereby establishing a corresponding slug of gas travelling down the subterranean well.

Statement 21: A system according to any of Statements 1 through 20, wherein the fluid dispensing system is controlled to deliver pressured liquid from the buffer tank for between about 5 and 15 seconds, thereby establishing a corresponding slug of liquid travelling down the subterranean well.

Statement 22: A system according to any of Statements 1 through 21, wherein the fluid dispensing system is controlled to deliver pressured gas from the buffer tank for between about 15 and 100 seconds, thereby establishing a corresponding slug of gas travelling down the subterranean well.

Statement 23: A system according to any of Statements 1 through 22, wherein the slug of gas travelling down the subterranean well establishes a bubble-region between consecutive slugs of liquid travelling down the subterranean well.

Statement 24: A method for conducting enhanced oil recovery by establishing a plurality of stacked, alternating slugs of gas and liquid travelling downhole into a subterranean well, the method comprising: providing an enhanced oil recovery system comprising: a buffer tank including: a liquid inlet through which liquid is received from a liquids source into the buffer tank; a gas inlet through which gas is received from a pressured gas source into the buffer tank; a gas outlet in fluid communication with gas reservoired in the buffer tank; and a liquid outlet in fluid communication with liquid reservoired in the buffer tank; a pressure control configured to maintain a specified pressure in gas reservoired within the buffer tank, and wherein the pressured gas reservoired within the buffer tank exerts a corresponding pressure on liquid reservoired within the buffer tank; and a fluid dispensing system in fluid communication with the gas and liquid outlets of the buffer tank, the fluid dispensing system being controlled to deliver alternating slugs of gas and liquid to a subterranean wellhead; and dispensing the alternating slugs of gas and liquid into the subterranean wellhead and thereby establishing a plurality of stacked, alternating slugs of gas and liquid travelling downhole into a subterranean well.

Statement 25: A method according to Statement 24, wherein the liquid inlet receives predominantly liquid-phase fluid from a mixing tank, constituting a liquid source, into the buffer tank.

Statement 26: A method according to any of Statements 24 and 25, wherein the gas inlet receives predominantly gas-phase fluid from a gas compressor, constituting a pressured gas source, into the buffer tank.

Statement 27: A method according to any of Statements 24 through 26, wherein the fluid dispensing system further comprises a pressured gas open/closed valve through which pressured gas from the buffer tank flows to the subterranean wellhead, the gas open/closed valve controlled to: open and initiate gas flow from the pressured buffer tank to the subterranean wellhead; and close and cease gas flow from the pressured buffer tank to the subterranean wellhead.

Statement 28: A method according to any of Statements 24 through 27, wherein the fluid dispensing system further comprises a pressured liquid open/closed valve through which pressured liquid from the buffer tank flows to the subterranean wellhead, the liquid open/closed valve controlled to: open and initiate liquid flow from the pressured buffer tank to the subterranean wellhead; and close and cease liquid flow from the pressured buffer tank to the subterranean wellhead.

Statement 29: A method according to any of Statements 24 through 28, wherein the fluid dispensing system further comprises a pressured gas open/closed valve through which pressured gas from the buffer tank flows to the subterranean wellhead, the gas open/closed valve controlled to: open and initiate gas flow from the pressured buffer tank to the subterranean wellhead; and close and cease gas flow from the pressured buffer tank to the subterranean wellhead.

Statement 30: A method according to any of Statements 24 through 29, wherein the fluid dispensing system is controlled to transition from delivering a slug of gas from the pressured buffer tank to a slug of liquid from the buffer tank by coordinated closure of the gas open/closed valve and opening of the liquid open/closed valve.

Statement 31: A method according to any of Statements 24 through 30, wherein the gas pressure of the gas slug at the gas open/closed valve immediately before transition from delivering a gas slug to delivering a liquid slug is substantially equal to the liquid pressure of the liquid slug at the liquid open/closed valve immediately after the transition in dependence on the gas pressure being applied on the liquid reservoired in the buffer tank.

Statement 32: A method according to any of Statements 24 through 31, wherein gas pressure is applied directly upon the liquid reservoired in the buffer tank by open contact of the gas on the liquid.

Statement 33: A method according to any of Statements 24 through 32, wherein the fluid dispensing system is controlled to transition from delivering a slug of liquid from the pressured buffer tank to a slug of gas from the buffer tank by coordinated closure of the liquid open/closed valve and opening of the gas open/closed valve.

Statement 34: A method according to any of Statements 24 through 33, wherein the liquid pressure of the liquid slug at the liquid open/closed valve immediately before transition from delivering a liquid slug to delivering a gas slug is substantially equal to the gas pressure of the gas slug at the gas open/closed valve immediately after the transition in dependence on the gas pressure being applied upon the liquid reservoired in the buffer tank.

Statement 35: A method according to any of Statements 24 through 34, wherein the gas pressure is applied directly upon the liquid reservoired in the buffer tank by open contact of the gas on the liquid.

Statement 36: A method according to any of Statements 24 through 35, wherein each of the gas open/closed valve and the liquid open/closed valve is remotely actuable.

Statement 37: A method according to any of Statements 24 through 36, wherein control of the gas open/closed valve and the liquid open/closed valve to transition between delivery of gas slugs and liquid slugs is automated.

Statement 38: A method according to any of Statements 24 through 37, wherein alternation between the delivery of gas slugs and liquid slugs to establish a stacked column of alternating slugs in a subterranean well is controlled so that a weight of the liquid slugs contributes a downward force on the stacked column at a formation to be stimulated.

Statement 39: A system for conducting enhanced oil recovery by establishing a continuous, mixed-phase column of gas and liquid travelling downhole into a subterranean well, the system comprising: a buffer tank including: a liquid inlet through which liquid is received from a liquids source into the buffer tank; a gas inlet through which gas is received from a pressured gas source into the buffer tank; a gas outlet in fluid communication with gas reservoired in the buffer tank; and a liquid outlet in fluid communication with liquid reservoired in the buffer tank; a pressure control configured to maintain a specified pressure in gas reservoired within the buffer tank, and wherein the pressured gas reservoired within the buffer tank exerts a corresponding pressure on liquid reservoired within the buffer tank; and a fluid dispensing system in fluid communication with the gas and liquid outlets of the buffer tank, the fluid dispensing system being controlled to simultaneously deliver gas and liquid to a subterranean wellhead and thereby establishing a continuous, mixed-phase column of gas and liquid travelling downhole into a subterranean well.

Statement 40: A system according to Statement 39, wherein the liquid inlet receives predominantly liquid-phase fluid from a mixing tank, constituting a liquid source, into the buffer tank.

Statement 41: A system according to any of Statements 39 and 40, wherein the gas inlet receives predominantly gas-phase fluid from a gas compressor, constituting a pressured gas source, into the buffer tank.

Statement 42: A system according to any of Statements 39 through 41, wherein the pressure of gas reservoired in the buffer tank is substantially equal to the pressure of liquid reservoired in the buffer tank.

Statement 43: A system according to any of Statements 39 through 42, wherein the pressure of gas reservoired in the buffer tank is substantially equal to the pressure of liquid reservoired in the buffer tank in dependence on the pressure of the gas reservoired in the buffer tank being applied on the liquid reservoired in the buffer tank.

Statement 44: A system according to any of Statements 39 through 43, wherein the pressure of gas reservoired in the buffer tank is applied directly upon the liquid reservoired in the buffer tank by open contact of the gas on the liquid.

What is claimed is:

1. A system for conducting enhanced oil recovery by establishing a plurality of stacked, alternating slugs of gas and liquid travelling downhole into a subterranean well, the system comprising:
    a buffer tank including:
        a liquid inlet through which liquid is received from a liquids source into the buffer tank;
        a gas inlet through which gas is received from a pressured gas source into the buffer tank;
        a gas outlet in fluid communication with gas reservoired in the buffer tank; and
        a liquid outlet in fluid communication with liquid reservoired in the buffer tank;
    a pressure control configured to maintain a specified pressure in gas reservoired within the buffer tank, and wherein the pressured gas reservoired within the buffer tank exerts a corresponding pressure on liquid reservoired within the buffer tank; and
    a fluid dispensing system in fluid communication with the gas outlet and the liquid outlets of the buffer tank, the fluid dispensing system being controlled to deliver alternating slugs of gas and liquid to a subterranean wellhead and thereby establishing the plurality of stacked, alternating slugs of gas and liquid travelling downhole into the subterranean well.

2. The system of claim 1, wherein the liquid inlet receives liquid-phase fluid from a mixing tank, constituting a liquid source, into the buffer tank.

3. The system of claim 1, wherein the gas inlet receives gas-phase fluid from a gas compressor, constituting a pressured gas source, into the buffer tank.

4. The system of claim 1, wherein the fluid dispensing system further comprises a pressured gas open/closed valve through which pressured gas from the buffer tank flows to the subterranean wellhead, the gas open/closed valve controlled to:
    open and initiate gas flow from the buffer tank to the subterranean wellhead; and
    close and cease gas flow from the buffer tank to the subterranean wellhead.

5. The system of claim 1, wherein the fluid dispensing system further comprises a pressured liquid open/closed valve through which pressured liquid from the buffer tank flows to the subterranean wellhead, the liquid open/closed valve controlled to:
    open and initiate liquid flow from the buffer tank to the subterranean wellhead; and
    close and cease liquid flow from the buffer tank to the subterranean wellhead.

6. The system of claim 5, wherein the fluid dispensing system further comprises a pressured gas open/closed valve through which pressured gas from the buffer tank flows to the subterranean wellhead, the gas open/closed valve controlled to:
    open and initiate gas flow from the buffer tank to the subterranean wellhead; and
    close and cease gas flow from the buffer tank to the subterranean wellhead.

7. The system of claim 6, wherein the fluid dispensing system is controlled to transition from delivering a slug of gas from the buffer tank to a slug of liquid from the buffer tank by coordinated closure of the gas open/closed valve and opening of the liquid open/closed valve.

8. The system of claim 7, wherein the gas pressure of the gas slug at the gas open/closed valve immediately before transition from delivering a gas slug to delivering a liquid slug is substantially equal to the liquid pressure of the liquid slug at the liquid open/closed valve immediately after the transition in dependence on the gas pressure being applied on the liquid reservoired in the buffer tank.

9. The system of claim 8, wherein gas pressure is applied directly upon the liquid reservoired in the buffer tank by open contact of the gas on the liquid.

10. The system of claim 6, wherein the fluid dispensing system is controlled to transition from delivering a slug of liquid from the pressured buffer tank to a slug of gas from the buffer tank by coordinated closure of the liquid open/closed valve and opening of the gas open/closed valve.

11. The system of claim 10, wherein the liquid pressure of the liquid slug at the liquid open/closed valve immediately before transition from delivering a liquid slug to delivering a gas slug is substantially equal to the gas pressure of the gas slug at the gas open/closed valve immediately after the transition in dependence on the gas pressure being applied upon the liquid reservoired in the buffer tank.

12. The system of claim 11, wherein the gas pressure is applied directly upon the liquid reservoired in the buffer tank by open contact of the gas on the liquid.

13. The system of claim 6, wherein each of the gas open/closed valve and the liquid 13, open/closed valve is remotely actuable.

14. The system of claim 13, wherein control of the gas open/closed valve and the liquid open/closed valve to transition between delivery of gas slugs and liquid slugs is automated.

15. The system of claim 14, wherein alternation between the delivery of gas slugs and liquid slugs to establish a stacked column of alternating slugs in the subterranean well is controlled so that a weight of the liquid slugs contributes a downward force on the stacked column at a formation to be stimulated.

16. The system of claim 10, wherein the transition from delivering a slug of liquid from the pressured buffer tank to a slug of gas from the buffer tank by coordinated closure of the liquid open/closed valve and opening of the gas open/closed valve occurs in one second.

17. The system of claim 10, wherein the fluid dispensing system is controlled to deliver pressured gas from the buffer tank for between 15 and 100 seconds, thereby establishing a corresponding slug of gas travelling down the subterranean well.

18. The system of claim 10, wherein the fluid dispensing system is controlled to deliver pressured liquid from the buffer tank for between 5 and 15 seconds, thereby establishing a corresponding slug of liquid travelling down the subterranean well.

19. The system of claim 18, wherein the fluid dispensing system is controlled to deliver pressured gas from the buffer tank for between 15 and 100 seconds, thereby establishing a corresponding slug of gas travelling down the subterranean well.

20. The system of claim 19, wherein the slug of gas travelling down the subterranean well establishes a bubble-region between consecutive slugs of liquid travelling down the subterranean well.

* * * * *